United States Patent
Li et al.

(10) Patent No.: US 12,291,598 B2
(45) Date of Patent: May 6, 2025

(54) PRESSURE SENSITIVE ADHESIVES MADE FROM UV CURING OF PLANT OIL-BASED POLYESTERS

(71) Applicant: Oregon State University, Corvallis, OR (US)

(72) Inventors: Kaichang Li, Corvallis, OR (US); Anlong Li, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 658 days.

(21) Appl. No.: 17/612,185

(22) PCT Filed: May 29, 2020

(86) PCT No.: PCT/US2020/035305
§ 371 (c)(1),
(2) Date: Nov. 17, 2021

(87) PCT Pub. No.: WO2020/243559
PCT Pub. Date: Dec. 3, 2020

(65) Prior Publication Data
US 2022/0251292 A1 Aug. 11, 2022

Related U.S. Application Data

(60) Provisional application No. 62/855,596, filed on May 29, 2019.

(51) Int. Cl.
C08G 63/42 (2006.01)
C08G 63/133 (2006.01)
C08G 63/688 (2006.01)
C09J 7/38 (2018.01)
C09J 167/00 (2006.01)

(52) U.S. Cl.
CPC .......... *C08G 63/42* (2013.01); *C08G 63/133* (2013.01); *C08G 63/688* (2013.01); *C09J 7/38* (2018.01); *C09J 167/00* (2013.01); *C08G 2170/40* (2013.01); *C09J 2301/302* (2020.08); *C09J 2301/416* (2020.08); *C09J 2467/00* (2013.01)

(58) Field of Classification Search
None
See application file for complete search history.

(56) References Cited

U.S. PATENT DOCUMENTS

| | | |
|---|---|---|
| 3,304,344 A | 2/1967 | Szawlowski et al. |
| 4,910,287 A | 3/1990 | McLafferty et al. |
| 5,869,301 A | 2/1999 | Nghiem et al. |
| 6,121,398 A | 9/2000 | Wool et al. |
| 6,713,184 B1 | 3/2004 | Ferencz et al. |
| 7,157,535 B2 | 1/2007 | Herr et al. |
| 7,772,712 B2 | 8/2010 | Frayne et al. |
| 8,796,351 B2 | 8/2014 | Koch |
| 9,315,704 B2 | 4/2016 | Li et al. |
| 9,493,693 B2 | 11/2016 | Li et al. |
| 9,556,368 B2 | 1/2017 | Li et al. |
| 9,951,260 B2 | 4/2018 | Li et al. |
| 10,030,182 B2 | 7/2018 | Li et al. |
| 2002/0188056 A1 | 12/2002 | Wool et al. |
| 2006/0014852 A1 | 1/2006 | Loccufier et al. |
| 2008/0185558 A1 | 8/2008 | Hein et al. |
| 2008/0220251 A1 | 9/2008 | Takaki |
| 2013/0089581 A1 | 4/2013 | Nielsen et al. |
| 2014/0154506 A1 | 6/2014 | Williams et al. |
| 2014/0342153 A1 | 11/2014 | Li et al. |
| 2014/0349109 A1 | 11/2014 | Li et al. |
| 2015/0148441 A1 | 5/2015 | Madsen et al. |
| 2015/0376468 A1 | 12/2015 | Cho et al. |
| 2016/0046844 A1 | 2/2016 | Hammond et al. |
| 2016/0200895 A1 | 7/2016 | Lipscomb et al. |
| 2016/0253927 A1 | 9/2016 | Chen et al. |
| 2017/0009103 A1 | 1/2017 | Li et al. |
| 2017/0009104 A1 | 1/2017 | Koch et al. |
| 2020/0079957 A1 | 3/2020 | Huang et al. |

FOREIGN PATENT DOCUMENTS

| | | |
|---|---|---|
| CN | 103154175 | 6/2013 |
| CN | 104105770 | 10/2014 |
| CN | 104349680 | 2/2015 |
| CN | 105111924 A | 12/2015 |
| CN | 105518039 | 4/2016 |
| CN | 107400498 A | 11/2017 |
| EP | 1854442 | 11/2007 |
| GB | 1 298 325 | 11/1972 |
| JP | 58001739 A | 1/1983 |
| JP | 2005505615 A | 2/2005 |
| JP | 2006028516 A | 2/2006 |
| JP | 2005512973 A | 1/2009 |

(Continued)

OTHER PUBLICATIONS

Chen et al. Photopatternable Biodegradable Aliphatic Polyester with Pendent Benzophenone Groups. Biomacromolecules 2015, 16, 10, 3329-3335 (Year: 2015).*
Tang et al., "Chapter 8: Bio-Based Epoxy Resin from Epoxidized Soybean Oil," published in *Soybean—Biomass, Yield and Productivity* ed. By Minobu Kasai, 2019.
Extended European Search Report issued for EP Application No. 20815212.4 on Jun. 5, 2023.
Asahara et al., "Crosslinked acrylic pressure-sensitive adhesives. I. Effect of the crosslinking reaction on the peel strength," J. Appl. Poly. Sci., 87(9): 1493-1499, Dec. 23, 2002.
Baumann et al., "Natural Fats and Oils—Renewable Raw Materials for the Chemical Industry," Angew. Chem. Int. Ed. Engl. 27:41-62, Jan. 1988.
Biermann et al., "New Syntheses with Oils and Fats as Renewable Raw Materials for the Chemical Industry," Angew. Chem. Int. Ed. 39:2206-2224, Jul. 4, 2000.

(Continued)

*Primary Examiner* — Sanza L. McClendon
(74) *Attorney, Agent, or Firm* — Klarquist Sparkman, LLP

(57) ABSTRACT

An ultraviolet radiation-curable composition comprising a polyester having at least one pendant ultraviolet radiation-curable moiety covalently bonded to the polyester, wherein the polyester does not contain any free-radically polymerizable activated C═C groups.

32 Claims, No Drawings

(56) References Cited

FOREIGN PATENT DOCUMENTS

| WO | WO 98/23683 A1 | 6/1998 |
| WO | WO 2001/037991 | 5/2001 |
| WO | WO 03033452 A1 | 4/2003 |
| WO | WO 03033492 A1 | 4/2003 |
| WO | WO 2008/144703 | 11/2008 |
| WO | WO 2012/024301 | 2/2012 |
| WO | WO 2013/086004 A1 | 6/2013 |
| WO | WO 2013/154610 | 10/2013 |
| WO | WO 2015/034864 | 3/2015 |
| WO | WO 2015/112492 A1 | 7/2015 |
| WO | WO 2020/092568 | 5/2020 |
| WO | WO 2020/106632 | 5/2020 |
| WO | WO 2020/243559 | 12/2020 |

OTHER PUBLICATIONS

Clark et al., "Synthesis and properties of polyesters from waste grapeseed oil: comparison with soybean and rapeseed oils," J. Polym. Environ., vol. 25, pp. 1-10, 2017.

Extended European Search Report issued for EPC Application No. 19886681.6 on Jun. 28, 2022.

International Search Report and Written Opinion issued for International Application No. PCT/US2019/062037 on Feb. 5, 2020.

International Search Report and Written Opinion of the International Searching Authority for International Application No. PCT/US2011/039450, dated Aug. 2, 2012.

Li et al., "Pressure-sensitive adhesives based on epoxidized soybean oil and dicarboxylic acids," ACS Sustainable Chemistry & Engineering, vol. 2, pp. 2090-2096, Jul. 18, 2014.

Li et al., "Pressure-sensitive adhesives based on soybean fatty acids," RSC Advances, 41(4): 21521-21530, May 6, 2014.

Liu et al., "Solid freeform fabrication of epoxidized soybean oil/epoxy composite with bis or polyalkyleneamine curing agents," Composites Part A 38(1):87-93, Jan. 2007.

Meier et al., "Plant oil renewable resources as green alternatives in polymer science," Chemical Society Reviews vol. 36, pp. 1788-1802, Jul. 23, 2007.

Merfeld et al., "Acid/epoxy reaction catalyst screening for low temperature (120° C.) powder coatings," Progress in Organic Coatings 52(2):98-109, Feb. 1, 2005.

Metzger et al., "Lipids as renewable resources: current state of chemical and biotechnological conversion and diversification," Appl Microbiol Biotechnol 71:13-22, Apr. 8, 2006.

Office Action issued for CN Application No. 201980089607.2 on Feb. 27, 2023.

Shogren et al., "Biodegradation Behavior of Some Vegetable Oil-based Polymers," Journal of Polymers and the Environment 12(3):173-178, Jul. 2004.

Bunker et al., "Miniemulsion polymerization of acrylated methyl oleate for pressure sensitive adhesives," *International Journal of Adhesion & Adhesives* 23(1): 29-38, Feb. 14, 2003.

Bunker et al., "Synthesis and Characterization of Monomers and Polymers for Adhesives from Methyl Oleate," *Journal of Polymer Science: Part A: Polymer Chemistry* 40(4): 451-458, Feb. 15, 2002.

Govindarajan et al., "A hydrophilic coumarin-based polyester for ambient-temperature initiator-free 3D printing: Chemistry, rheology and interface formation," *Polymer*, vol. 152, pp. 9-17, Sep. 12, 2018.

International Search Report and Written Opinion issued for International Application No. PCT/US2020/035305 on Oct. 19, 2020.

U.S. Appl. No. 17/288,446, filed Apr. 23, 2021.

U.S. Appl. No. 17/295,004, filed May 18, 2021.

Zhao et al., "High Performance and Thermal Processable Dicarboxylic Acid Cured Epoxidized Plant Oil Resins through Dynamic Vulcanization with Poly(lactic acid)," *ACS Sustainable Chem. Eng.*, 5(2): 1938-1947, Dec. 21, 2016.

Office Action received for Japanese Patent Application No. 2021-571380, dated Jul. 2, 2024, 7 pages (English Translation).

\* cited by examiner

PRESSURE SENSITIVE ADHESIVES MADE FROM UV CURING OF PLANT OIL-BASED POLYESTERS

This application is the U.S. National Stage of International Application No. PCT/US2020/035305, filed May 29, 2020, which was published in English under PCT Article 21(2), which in turn claims the benefit of U.S. Provisional Patent Application No. 62/855,596, filed May 31, 2019, which application is incorporated herein by reference.

BACKGROUND

A pressure sensitive adhesive (PSA) is an adhesive that is permanently tacky and has sufficient cohesive strength to resist shear. It can readily form adhesive bonds with a variety of adherends when light pressure is applied. No solvent, heat or radiation is needed to activate the PSAs. Therefore, the PSAs are convenient to use and thus find applications in a wide variety of products such as PSA tapes, labels and protective films.

Currently, the majority of commercial PSAs are made from non-renewable petrochemicals such as 2-ethylhexyl acrylate and butyl acrylate. Recently, PSAs from renewable plant oils have been reported or disclosed, which are prepared with the following approaches. One approach is based on free radical polymerization (U.S. Pat. No. 8,796,351; Bunker et al, Miniemulsion polymerization of acrylated methyl oleate for pressure sensitive adhesives, *International Journal of Adhesion & Adhesives* 23 (2003) 29-38, Bunker et al, Synthesis and Characterization of Monomers and Polymers for Adhesives from Methyl Oleate, *Journal of Polymer Science: Part A: Polymer Chemistry* 40 (2002) 451-458). In this approach, radically polymerizable acrylate groups are first introduced onto plant oils, fatty acid or fatty acid esters. The resulting acrylated products are then copolymerized with acrylic acid and/or acrylic monomers via a solution or emulsion polymerization method to give polyacrylates. The resulting solution or emulsion are then dried by removing the solvent or water, respectively, to give PSAs, which processing requires high energy and could limit the production speed. For the solution-based formulations, removal of the organic solvents could also generate air pollution. In another approach, polyesters from epoxidized plant oils and dicarboxylic acids are thermally cured to make PSAs, which is disclosed in U.S. Pat. Nos. 9,315,704 and 9,556,368. The thermal curing of the polyesters typically requires a long curing time (e.g., from minutes to hours depending on the curing temperature), and thus could limit the production speed.

PSAs can be produced through the curing of polymers with ultraviolet (UV) light. The UV curing is typically very efficient, and thus allows a high-speed production of PSAs. U.S. Pat. No. 8,796,351 discloses PSAs from UV-initiated cationic polymerization of epoxidized plant oils and acrylic copolymers containing epoxy groups. The formulations are solvent-based; a pre-heating step is thus required to remove the organic solvent prior to the UV curing step, which is energy-consuming and could generate air pollutions. In addition, the formulations use photoinitiators that generates cationic species to initiate polymerization. The cationic species is typically water-sensitive, and thus exclusion of moisture that contains water is necessary for the UV curing.

U.S. Pat. No. 8,796,351 also discloses PSAs from UV-initiated free radical polymerization of acrylated epoxidized soybean oil that contains acrylate groups with other acrylic monomers. U.S. Provisional Patent Application No. 62/770,091 also discloses UV-cured PSAs from plant oil-based formulations that contain polymerizable activated C=C groups such as acrylate groups. The curing of the above formulations involves free-radically polymerization of the acrylate groups, which is initiated by the radicals that are generated with UV radiation. The free radical polymerization is readily inhibited by oxygen from the air environment. Thus, it is necessary to exclude the formulations from oxygen, e.g., by purging nitrogen gas, in the UV curing step, which considerably increases the production cost of the PSAs.

SUMMARY

Disclosed herein is an ultraviolet radiation-curable composition comprising a polyester having at least one pendant ultraviolet radiation-curable moiety covalently bonded to the polyester, wherein the polyester does not contain any free-radically polymerizable activated C=C groups.

The composition can be ultraviolet radiation cured to form a pressure sensitive adhesive composition.

A construct (e.g. a tape) having a backing substrate upon which the pressure sensitive adhesive composition is disposed is also disclosed.

Also disclosed herein is a method comprising reacting (a) at least one epoxidized plant oil with (b) a compound that contains at least one —COOH group and at least one UV-active moiety, wherein the UV-active moiety is benzophenone or thioxanthone; a compound that contains at least one —OH group and at least one UV-active moiety, wherein the UV-active moiety is benzophenone, thioxanthone or acetophenone; phenylglyoxylic acid; or a mixture thereof, resulting in covalently bonding the at least one UV-active moiety to the epoxidized plant oil; and reacting the resulting modified epoxidized plant oil that contains the at least one covalently bonded UV-active moiety with (c) at least one dicarboxylic acid, at least one polycarboxylic acid, or a mixture thereof, to form a resin.

Additionally disclosed herein is a method comprising reacting at least one dicarboxylic acid, at least one polycarboxylic acid, or a mixture thereof with (i) at least one epoxidized plant oil or a monocarboxylic acid-modified epoxidized plant oil under reaction condition that the molar ratio of —COOH groups of the at least one dicarboxylic acid, at least one polycarboxylic acid, or a mixture thereof to the epoxy groups of the at least one epoxidized plant oil or a monocarboxylic acid-modified epoxidized plant oil is greater than 1.0 to form a polyester that is capped with —COOH groups at chain ends; and reacting the resulting polyester with a modified epoxidized plant oil that contains at least one covalently bonded UV-active moiety.

The foregoing will become more apparent from the following detailed description.

DETAILED DESCRIPTION

The term "pressure sensitive adhesive" as used herein refer to adhesives that possess properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as PSAs are polymers designed and formulated to exhibit the requisite viscoelastic properties resulting in a desired balance of tack, peel adhesion, and shear holding power.

The term "alkyl" refers to a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is a saturated branched or unbranched hydrocarbon having from 1 to 6 carbon atoms. Preferred alkyl groups have 1 to 4 carbon atoms. Alkyl groups may be "substituted alkyls" wherein one or more hydrogen atoms are substituted with a substituent such as halogen, cycloalkyl, alkoxy, amino, hydroxyl, aryl, alkenyl, or carboxyl. For example, a lower alkyl or $(C_1-C_6)$alkyl can be methyl, ethyl, propyl, isopropyl, butyl, iso-butyl, sec-butyl, pentyl, 3-pentyl, or hexyl; $(C_3-C_6)$cycloalkyl can be cyclopropyl, cyclobutyl, cyclopentyl, or cyclohexyl; $(C_3-C_6)$cycloalkyl$(C_1-C_6)$alkyl can be cyclopropylmethyl, cyclobutylmethyl, cyclopentylmethyl, cyclohexylmethyl, 2-cyclopropylethyl, 2-cyclobutylethyl, 2-cyclopentylethyl, or 2-cyclohexylethyl; $(C_1-C_6)$alkoxy can be methoxy, ethoxy, propoxy, isopropoxy, butoxy, isobutoxy, sec-butoxy, pentoxy, 3-pentoxy, or hexyloxy; $(C_2-C_6)$alkenyl can be vinyl, allyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl; $(C_2-C_6)$alkynyl can be ethynyl, 1-propynyl, 2-propynyl, 1-butynyl, 2-butynyl, 3-butynyl, 1-pentynyl, 2-pentynyl, 3-pentynyl, 4-pentynyl, 1-hexynyl, 2-hexynyl, 3-hexynyl, 4-hexynyl, or 5-hexynyl; $(C_1-C_6)$alkanoyl can be acetyl, propanoyl or butanoyl; halo$(C_1-C_6)$alkyl can be iodomethyl, bromomethyl, chloromethyl, fluoromethyl, trifluoromethyl, 2-chloroethyl, 2-fluoroethyl, 2,2,2-trifluoroethyl, or pentafluoroethyl; hydroxy$(C_1-C_6)$alkyl can be hydroxymethyl, 1-hydroxyethyl, 2-hydroxyethyl, 1-hydroxypropyl, 2-hydroxypropyl, 3-hydroxypropyl, 1-hydroxybutyl, 4-hydroxybutyl, 1-hydroxypentyl, 5-hydroxypentyl, 1-hydroxyhexyl, or 6-hydroxyhexyl; $(C_1-C_6)$alkoxycarbonyl can be methoxycarbonyl, ethoxycarbonyl, propoxycarbonyl, isopropoxycarbonyl, butoxycarbonyl, pentoxycarbonyl, or hexyloxycarbonyl; $(C_1-C_6)$alkylthio can be methylthio, ethylthio, propylthio, isopropylthio, butylthio, isobutylthio, pentylthio, or hexylthio; $(C_2-C_6)$ alkanoyloxy can be acetoxy, propanoyloxy, butanoyloxy, isobutanoyloxy, pentanoyloxy, or hexanoyloxy.

Disclosed herein are novel polyesters prepared from renewable plant oils, which can be readily coated and cured with ultraviolet (UV) radiation to afford pressure sensitive adhesives (PSA). The invention also relates to methods of making the polyesters and the UV-cured PSAs.

The UV-curable polyesters contain UV-active moieties. In certain embodiments, the UV-curable polyesters are made from (a) at least one epoxidized plant oil or monocarboxylic acid-modified epoxidized plant oil, (b) at least one dicarboxylic acid and/or polycarboxylic acid, and (c) a UV-active compound. The UV-active compound is attached to the polymer chains of the polyester via covalent bonds. The polyesters containing UV-active moieties can be readily coated and cured with ultraviolet UV radiation to afford pressure sensitive adhesives.

The presently disclosed UV-curable polyesters do not contain or include radically polymerizable activated C=C groups. It is unexpected that the UV-curable polyesters can be UV-cured to give PSAs with sufficient cohesive strength despite not containing polymerizable activated C=C groups. In certain embodiments, the PSAs are deemed to have sufficient cohesive strength if they have a shear adhesion of at least 168 hours (see the below section "Measurement of the shear adhesion of a PSA" for the details of measuring the shear adhesion). In addition, the polyesters can be cured with a much lower UV energy dosage, i.e., they can be cured at a faster speed and a higher efficiency, as compared to the formulations disclosed or reported in the literature. In certain embodiments, a UV energy dosage of as low as 0.1 $J/cm^2$ is enough for curing the polyesters. As a comparison, typical formulations disclosed in the literature (see, e.g., U.S. Pat. Nos. 9,453,151 and 8,796,351) require a UV dosage of about 2 $J/cm^2$ to 6 $J/cm^2$. Furthermore, the UV-curing of the polyesters presents an excellent oxygen tolerance, which is evidenced by the fact that curing in ambient air can take place with the same speed and efficiency as that in oxygen-free environment; therefore, exclusion of oxygen is not necessary for the UV curing.

Epoxidized Plant Oils

The epoxidized plant oils (EPO) are generally any derivative of plant oils whose double bonds are fully or partly epoxidized using any known epoxidation method such as the in-situ performic acid process that is the widely used in industry The plant oils used to make epoxidized plant oils include but are not limited to soybean oil, canola oil, palm oil, olive oil, corn oil, cottonseed oil, linseed oil, rapeseed oil, castor oil, coconut oil, palm kernel oil, rice bran oil, safflower oil, sesame oil, sunflower oil, or other polyunsaturated plant oils, or mixtures thereof. In addition, monoglycerides and diglycerides of unsaturated fatty acids derived from plant oils can be also used herein for the preparation of the epoxidized plants oils. Soybean oil is one of the least expensive plant oils and its epoxidized product, epoxidized soybean oil (ESO), is commercially available, e.g., from supplier CHS Inc. (Inver Grove Heights, MN). ESO is preferably used in the compositions and methods disclosed herein. In certain embodiments, more than one epoxidized plant oil and/or epoxidized animal fat can be utilized in a single reaction mixture if desired.

Monocarboxylic Acid-Modified Epoxidized Plant Oils

Certain epoxidized plant oils (EPO) have more than two epoxy groups per one triglyceride molecule, which can result in crosslinked polymers when they are polymerized with dicarboxylic acids and/or polycarboxylic acids; the crosslinked polymers are not thermoplastic and thus cannot be uniformly coated onto backing materials. Therefore, in some embodiments, the EPOs with high epoxy functionality are modified by reacting with at least one monocarboxylic acid or its anhydride derivative ("modifier") to lower their epoxy functionality. The monocarboxylic acids that can be used herein include, but are not limited to, formic acid, acetic acid, propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachildic acid, heneicosylic acid, behenic acid, tricosylic acid, and lignoceric acid, naphthalene acid, oleic acid, linoleic acid, myristoleic acid, palmitoleic acid, sapienic acid, elaidic acid, vaccenic acid, linoelaidic acid, linolenic acid, arachidonic acid, eicosapentaenoic acid, erucic acid, docosahexanenoic acid, benzoic acid, phenylacetic acid, 1-naphthaleneacetic acid, 2-naphthaleneacetic acid, 1-naphthoic acid, 2-naphthoic acid, 2-furoic acid, 3-methylpyridine-2-carboxylic acid, 1-methylpyrrole-2-carboxylic acid, pyrimidine-2-carboxylic acid, and mixtures thereof. The epoxy functionality of the monocarboxylic acid-modified epoxidized plant oils (MEPO) can be adjusted by changing the amount of monocarboxylic acid used in the modification reaction. The epoxy functionality of MEPOs as well as other polymerization parameters determines the molecular weight and crosslinking (if any) density of the PSAs formed from polymerizations of MEPOs with dicarboxylic acids/polycarboxylic acids. In other words, the molecular weight and crosslinking density of the PSAs can be adjusted by changing the epoxy functionality of MEPO to meet various needs of PSA applications. For example, for removable or ultra-removable PSAs, the molecular weight and crosslinking density of the PSA polymers can be designed and adjusted to be higher than those for permanent PSAs.

The modification of EPOs with monocarboxylic acids takes place via the reaction between the epoxy groups of EPOs and the carboxylic acid groups of the monocarboxylic acids, which can be readily accelerated in the presence of a catalyst. The catalyst used herein can be any of the following or mixtures thereof: (1) amines such as triethylamine, dimethylbenzylamine, 2-methylpyridine, 1-methylimidazole, 1,5-diazabicyclo[4.3.0]non-5-ene and 1,8-diazabicyclo[5.4.0]undec-7-ene; (2) metal salts or complexes such as chromium (III) tris(acetylacetonate), chromium (III) 2-ethylhexanoate, AFC Accelerator AMC-2 (a solution of chromium (III) complex from Ampac Fine Chemical LLC (Rancho Cordova, CA)), zinc acetylacetonate, zinc octoate, stannous octoate, titanium acetylacetonate, zirconium octoate, nickel acetylacetonate, manganese naphthenate, iron octoate, iron acetylacetonate, cobalt octoate, cobalt acetylacetonate, aluminum acetylacetonate, dibutyltin dilaurate, dibutyltin oxide, cerium naphthenate, calcium octoate, bismuth octoate, lithium acetate, sodium acetate, potassium acetate, magnesium acetate hydrate, magnesium acetate anhydride and magnesium oxide; (3) quaternary ammonium compounds such as benzyltriethyl ammonium chloride, tetra (n-butyl) ammonium bromide and tetramethyl ammonium chloride; (4) quaternary phosphonium compounds such as tetra(n-butyl) phosphonium bromide, ethyltriphenyl phosphonium iodide, tetraphenyl phosphonium bromide, and n-butyltriphenyl phosphonium chloride; (5) phosphines such as triphenylphosphine; (6) metal hydroxide such as and magnesium hydroxide, potassium hydroxide and sodium hydroxide. The catalyst can be used in an amount of 0.02 wt % to 5.0 wt %, preferably 0.1 wt % to 1.0 wt % based on the total mass of the reaction mixture. In the presence of a catalyst, the reactions between EPOs and the monocarboxylic acids can be complete in a typical time of 0.5 h to 8 h at a temperature from 30° C. to 300° C., more typically, in a time of 1 h to 5 h at a temperature from 90° C. to 180° C.

Dicarboxylic Acid and/or Polycarboxylic Acid

Dicarboxylic acid and/or polycarboxylic acid (DA/PA) used in preparing the PSAs can be any organic compounds that contain at least two carboxylic acid (—COOH) groups, which include but are not limited to, malonic acid, succinic acid, glutaric acid, adipic acid, pimelic acid, suberic acid, azelaic acid, sebacic acid, and brassylic acid, phthalic acid, isophthalic acid, terephthalic acid, dimer acid, trimer acid, or a mixture thereof. Dimer acid is a dimer of an unsaturated fatty acid, and trimer acid is a timer of an unsaturated fatty acid. The preparation and separation of dimer acid and trimer acid are well-known in the art, see, e.g., U.S. Pat. No. 3,287,273. Typically, unsaturated fatty acid or mixtures of unsaturated fatty acids, e.g., tall oil fatty acids that consist mainly of oleic acid and linoleic acid, are heated at elevated temperatures in the presence of clay catalysts (e.g., montmorillonite clay) to give a mixture of dimer acid and trimer acid as well as a small amount of polymeric fatty acid and unreacted fatty acids. Separation of the reaction mixture affords pure dimer acid or products that mainly consist of dimer acid and/or trimer acid. The products can be further hydrogenated to give saturated forms of dimer acid or trimer acid. Dimer acid, trimer acid and their saturated forms are commercially available under the brand names of, e.g., UNIDYME (distributed by Arizona Chemical, LLC (Jacksonville, FL)) and PRIPOL (distributed by Croda International Plc (Snaith, UK)). For example, UNIDYME 18 contains about 80 wt % of dimer acid and about 17 wt % of trimer acid. UNIDYME 14 contains about 95 wt % of dimer acid and about 5 wt % of trimer acid. UNIDYME 60 contains about 60 wt % of trimer acid and 40 wt % of dimer acid. UNIDYME M15 contains about 77 wt % of dimer acid, 15 wt % of trimer acid and 8 wt % of unreacted fatty acids. PRIPOL 1009 contains about 99 wt % of hydrogenated dimer acid. PRIPOL 1025 contains about 80 wt % of hydrogenated dimer acid and 20 wt % of hydrogenated trimer acid.

In some embodiments, polymers/oligomers that are capped with —COOH groups at chain ends are used as dicarboxylic acids or polycarboxylic acids to polymerize EPOs or MEPOs. The COOH-capped polymers/oligomers can be prepared from polymerization of at least one previously-described DA/PA with at least one diamine/polyamine under a reaction condition that the molar ratio of the —COOH groups to the amine groups of the diamine/polyamine is greater than 1.0, preferably greater than 1.2. The polymerization proceeds via the reaction between —COOH and amine groups; when all of the amine groups are consumed, polyamides that are capped with —COOH groups at chain ends are obtained. By selecting the reactants and adjusting the —COOH/amine molar ratio, an array of thermoplastic polymers/oligomers capped with —COOH groups at chain ends can be obtained. Illustrative diamines/polyamines that can be used herein include but are not limited to, 1,2-ethylenediamine, 1,6-hexanediamine, 1,3-propylenediamine, 1,2-propylenediamine, 1,4-butanediamine, 1,5-pentanediamine, diphenylethylenediamine, diaminocyclohexane, o-xylylenediamine, m-xylylenediamine, p-xylylenediamine, o-phenylenediamine, m-phenylenediamine, p-phenylenediamine, 2,5-diaminotoluene, dimethyl-4-phenylenediamine, N,N'-di-2-butyl-1,4-phenylenediamine, 4,4'-diaminobiphenyl, 1,8-diaminonaphthalene, and diamines or polyamines that are sold under brand name Jeffamine (distributed by Huntsman Corp. (Woodlands, TX)). The polymerization of DA/PA with the diamine/polyamines can be performed at a temperature suitably in the range from 100° C. to 300° C. for 0.5 h to 7 h, preferably from 130° C. to 200° C. for 1 h to 4 h. Preferably, vacuum or nitrogen purging is applied to the reaction mixture at the later stage of the reaction to remove the by-product, water.

COOH-capped polymers/oligomers can be also prepared from polymerization of at least one previously-described DA/PA with at least one epoxy compound that has at least two epoxy functional groups under the reaction condition that the molar ratio of —COOH groups to the epoxy groups of the epoxy compound is greater than 1.0, preferably greater than 1.2. The polymerization proceeds via the reaction between —COOH and epoxy groups; when all of the epoxy groups are consumed, polyesters that are capped with —COOH groups at chain ends are obtained. Epoxy compounds that can be used herein include but are not limited to bisphenol A diglycidyl ether, bisphenol A ethoxylate diglycidyl ether, bisphenol A propoxylate diglycidyl ether, bisphenol F diglycidyl ether, bisphenol F ethoxylate diglycidyl ether, bisphenol F propoxylate diglycidyl ether, ethylene glycol diglycidyl ether, diethylene glycol diglycidyl ether, poly(ethylene glycol) diglycidyl ether, propylene glycol diglycidyl ether, dipropylene glycol diglycidyl ether, poly (propylene glycol) diglycidyl ether, 1,3-butanediol diglycidyl ether, 1,4-butanediol diglycidyl ether, neopentyl glycol diglycidyl ether, glycerol diglycidyl ether, diglycidyl 1,2,3,6-tetrahydrophthalate, 1,2-cyclohexanedicarboxylate diglycidyl ether, dimer acid diglycidyl ester, 1,4-cyclohexanedimethanol diglycidyl ether, resorcinol diglycidyl ether, poly(dimethylsiloxane) terminated with diglycidyl ether, trimethylolpropane triglycidyl ether, trimethylolethane triglycidyl ether, N,N-diglycidyl-4-glycidyloxyaniline, 4,4'-methylene bis(N,N-diglycidylaniline), tris(4-hydroxyphenyl)methane triglycidyl ether, tris(2,3-epoxypropyl) cyanurate, tris(2,3-epoxypropyl) isocyanurate, epoxidized polybutadiene, epoxidized fatty acid esters, epoxidized plant oils, epoxidized animal fats, and mixtures thereof. The polymerization of DA/PA with the epoxy compound can be performed at a temperature suitably in the range from 80° C. to 250° C. for 0.5 h to 8 h, preferably from 130° C. to 160° C. for 1 h to 4 h.

Furthermore, COOH-capped polymers/oligomers can be also prepared from polymerization of at least one previously-described DA/PA with at least one diol/polyol under reaction condition that the molar ratio of —COOH groups to the hydroxyl groups of the diol/polyol is greater than 1.0, preferably greater than 1.2. The polymerization proceeds via the reaction between —COOH and hydroxyl groups; when all of the hydroxyl groups are consumed, polyesters that are capped with —COOH groups at chain ends are obtained. The diols/polyols that can be used herein include but are not limited to ethylene glycol, 1,2-propanediol, 1,3-propanediol, 1,2-butanediol, 1,3-butanediol, 2,3-butanediol, 1,4-butanediol, 1,2-pentanediol, 1,5-pentanediol, 1,8-octanediol, etohexadiol, p-menthane-3,8-diol, 2-methyl-2,4-pentanediol, glycerin, trimethylolpropane, pentaerythritol, maltitol, sorbitol, xylitol, isomalt, and mixtures thereof. The polymerization of DA/PA with the diol/polyol can be performed at a temperature suitably in the range from 110° C. to 280° C. for 0.5 h to 8 h, preferably from 140° C. to 200° C. for 1.5 h to 5 h.

Modified ESO Containing Covalently-Bonded UV-Active Moiety

Epoxidized soybean oil (ESO) is reacted with (a) a small amount of at least one compound containing UV-active moiety, and optionally (b) at least one monocarboxylic acid, to give a modified ESO that contains covalently-bonded UV-active moietie(s).

In some embodiments, the compound (a) that contains at least one —COOH group and at least one UV-active moiety is used, which includes but is not limited to, benzophenone derivatives such as 2-benzoylbenzoic acid, 4-benzoylbenzoic acid and 2-(4-benzoylphenoxy)acetic acid, and thioxanthone derivatives such as thioxanthone-2-carboxylic acid and thioxanthone-4-carboxylic acid, and phenylglyoxylic acid (structures of the above compounds are shown below).

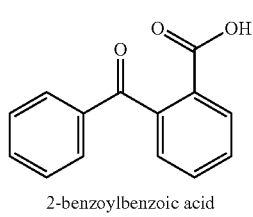

2-benzoylbenzoic acid

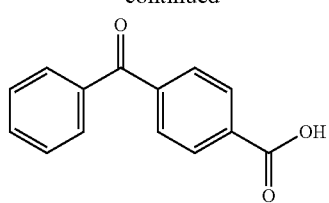

4-benzoylbenzoic acid

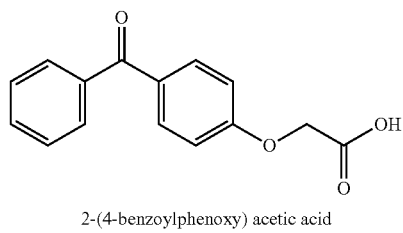

2-(4-benzoylphenoxy) acetic acid

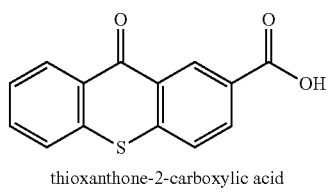

thioxanthone-2-carboxylic acid

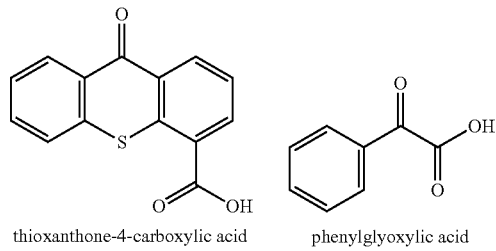

thioxanthone-4-carboxylic acid        phenylglyoxylic acid

Compounds Containing Both —COOH Group and a UV-Active Moiety

The compound (a) reacts with ESO to give a modified ESO that contains UV-active moieties via the reaction between —COOH groups of the compound (a) and the epoxy groups of ESO. The reaction scheme is shown below. The resulting modified ESO can have an average of from 0.01 mole to 1.8 moles, preferably from 0.05 to 1.0 mole of UV-active moieties per mole of ESO molecule.

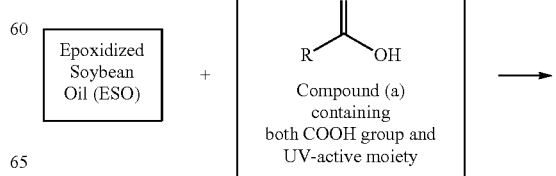

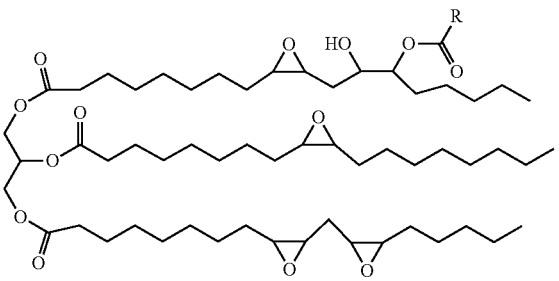

Reaction of ESO with a Compound that Contains Both —COOH Group and UV-Active Moiety In particular embodiments, at least one monocarboxylic acid (b) that does not contain UV-active moieties (e.g., acetic acid) is optionally added to the reaction mixture of ESO and compound (a) so that the resulting modified-ESO has a reduced epoxy functionality, thus avoiding a potential gel formation in the subsequent polymerization of the modified-ESO with DA/PA. Examples of the monocarboxylic acid (b) are described in the above section titled "Monocarboxylic acid-modified epoxidized plants oil". The reaction of ESO with the compound (a) and optionally the monocarboxylic acid (b) readily takes place in the presence of a catalyst. The catalysts that are typically used to catalyze the reaction between epoxy and —COOH groups can be used herein; see examples described in the above section titled "Monocarboxylic acid-modified epoxidized plants oil". Preferably, magnesium-based catalysts such as magnesium acetate and magnesium hydroxide are used herein. The catalyst can be used in an amount of 0.01 wt % to 5.0 wt %, preferably 0.1 wt % to 1.5 wt % based on the total mass of reaction mixture. In the presence of a catalyst, the reactions can be completed in a typical time of from 0.5 h to 7 h at a temperature of from 30° C. to 300° C., more typically, in a time of from 1 h to 5 h at a temperature of from 90° C. to 180° C.

In other embodiments, a compound (a) that contains both hydroxyl (—OH) group and UV-active moiety is used. Illustrative compounds include, but is not limited to, benzophenone derivatives such as 4-hydroxybenzophenone and 3-hydroxybenzophenone, thioxanthone derivatives such as 2-hydroxythioxanthen-9-one, and acetophenone derivatives such as 4'-hydroxyacetophenone and 3'-hydroxyacetophenone (structures of the above compounds are shown below).

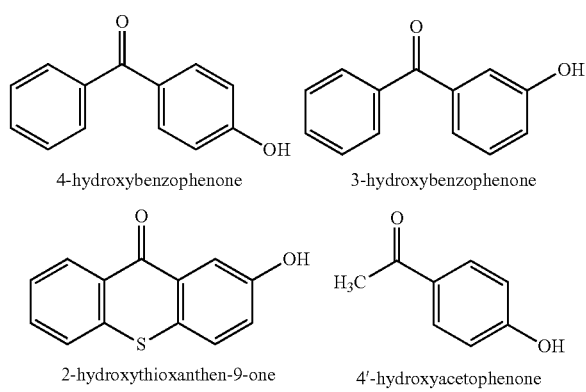

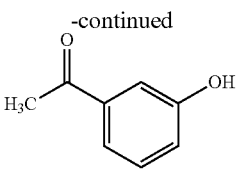

3'-hydroxyacetophenone

Compounds Containing Both Hydroxyl Group and UV-Active Moiety

The compound (a) reacts with ESO to give a modified ESO that contains UV-active moieties via the reaction between —OH of the compound (a) and the epoxy groups of ESO. The reaction scheme is shown below. The resulting modified ESO can have an average of from 0.01 mole to 1.8 moles, preferably from 0.05 to 1.0 mole of UV-active moieties per mole of ESO molecule.

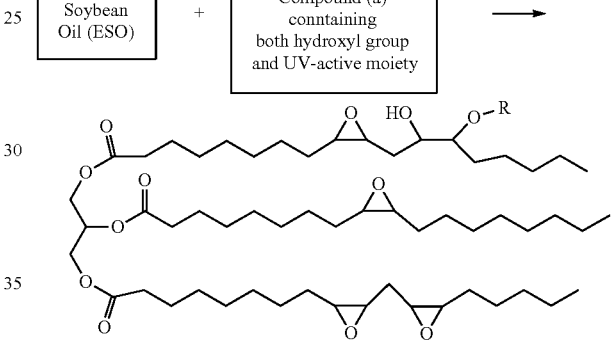

Reaction of ESO with a compound that contains both hydroxyl group and UV-active moiety In particular embodiments, at least one monocarboxylic acid (b) that does not contain UV-active moieties (e.g., acetic acid) is optionally added to the reaction mixture of ESO and the compound (a) so that the resulting modified-ESO has a reduced epoxy functionality, thus avoiding a potential gel formation in the subsequent polymerization of the modified-ESO with DA/PA. Examples of the monocarboxylic acid (b) are described in the above section titled "Monocarboxylic acid-modified epoxidized plants oil". The reaction of ESO with the compound (a) and optionally monocarboxylic acid (b) readily takes place in the presence of a catalyst, which includes but is not limited to quaternary ammonium compounds such as tetra(n-butyl) ammonium chloride and benzyltriethyl ammonium chloride, and quaternary phosphonium compounds such as tetra(n-butyl) phosphonium chloride. The catalyst can be used in an amount of 0.02 wt % to 5.0 wt %, preferably 0.1 wt % to 1.5 wt % based on the total mass of reaction mixture. In the presence of a catalyst, the reactions can be completed in a typical time of from 0.5 h to 6 h at a temperature of from 80° C. to 300° C., more typically, in a time of from 1 h to 4 h at a temperature of from 120° C. to 180° C.

The UV-active compound (a) can be used in an amount of 0.01 wt % to 10 wt %, preferably 0.1 wt % to 5.0 wt % based on the total mass of the final polyesters.

PSAs from Polyesters with Pendant UV-Active Moieties Along the Polymer Chains

In some embodiments (see, e.g., Examples 1, 2, 3, 4 and 5 below), the modified-ESO containing UV-active moieties are polymerized with DA/PA to give polyesters with pendant UV-active moieties along the polymer chains. The polymerization scheme and a representative polyester structure are shown below.

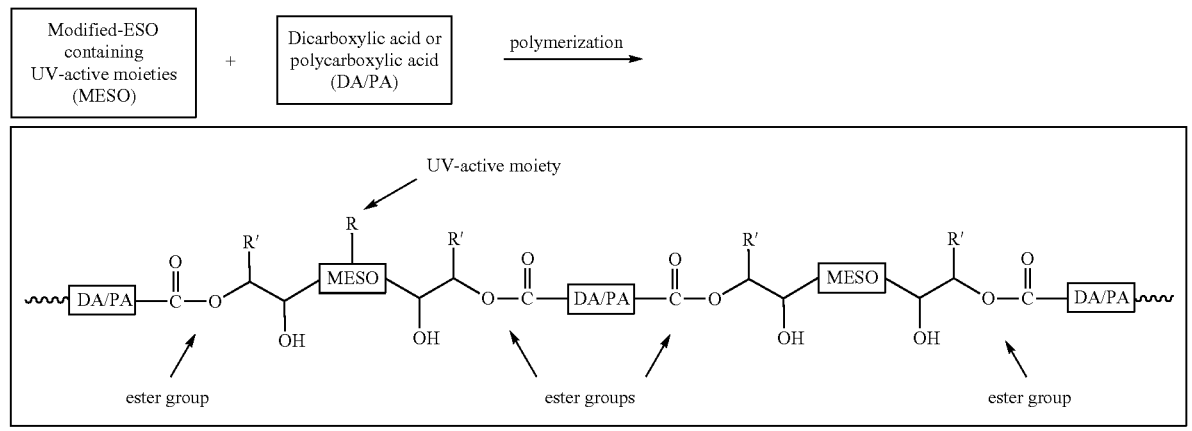

Scheme of the polymerization of the modified-ESO containing UV-active moieties with DA/PA, and a representative structure of the resulting polyester ( ⁓⁓⁓ represents the remaining polymer chains; R is a UV-active moiety; and each R' is independently an alkyl group that is part of fatty acid chains from epoxidized soybean oil)

The polymerization can readily take place via the reaction between —COOH groups of the DA/PA and the epoxy groups of the modified ESO in the presence of a catalyst (see examples presented in the section "Monocarboxylic acid-modified epoxidized plants oil"). The polymerization can be performed at a temperature suitably in the range from 50° C. to 250° C. for 1.5 h to 15 h, preferably from 100° C. to 180° C. for 2.5 h to 10 h.

In other embodiments (see, e.g., Example 6, 7, 8, 9 and 10 below), DA/PA is polymerized with a mixture of (a) modified-ESO that contains UV-active moieties and (b) a monocarboxylic acid-modified ESO (MA-ESO) that does not contain UV-active moieties. The polymerization scheme and a representative polyester structure are shown below.

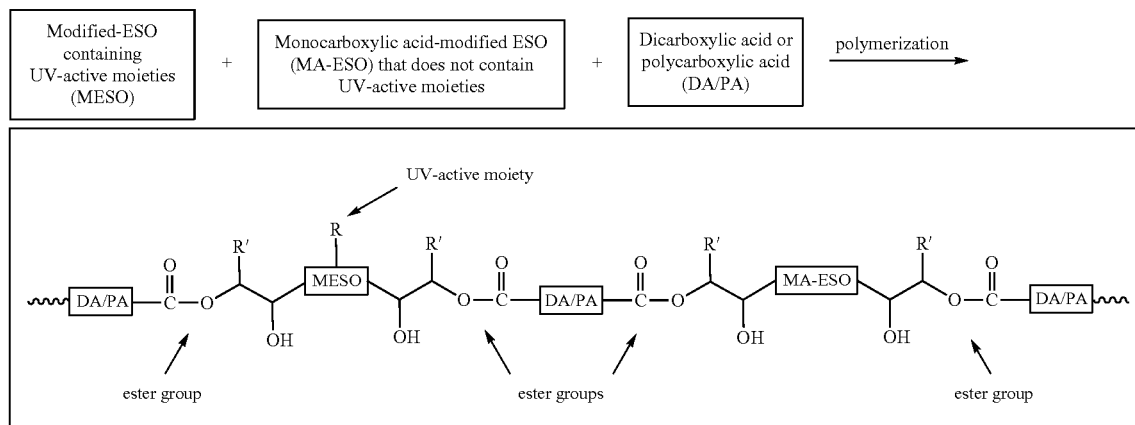

Scheme of the polymerization of DA/PA with a mixture of a modified-ESO that contains UV-active moieties and a MA-ESO that does not contain UV-active moieties, and a representative structure of the resulting polyester ( ⁓⁓⁓ represents the remaining polymer chains; R is a UV-active moiety; and each R' is independently alkyl groups that are parts of fatty acid chains from epoxidized soybean oil)

MA-ESO can be readily prepared by reacting ESO with a monocarboxylic acid; see previous section "Monocarboxylic acid-modified epoxidized plants oil" for the details of the preparation. In these cases, MA-ESO and the modified-ESO containing UV-active moieties are added to the reaction mixture all at once to polymerize DA/PA, the resulting polyesters are "random copolymers" and thus have pendant UV-active moieties randomly scattered along the polymer chains. The polymerization can be performed at a temperature suitably in the range from 50° C. to 250° C. for 1.5 h to 15 h, preferably from 100° C. to 180° C. for 2.5 h to 10 h, in the presence of a catalyst (see examples presented in the section "Monocarboxylic acid-modified epoxidized plants oil").

In particular embodiments (see, e.g., Examples 11, 12, 13, 14, 15 and 16 below), the UV-active moieties are primarily distributed at pendant positions of the resulting polyester chains as shown below.

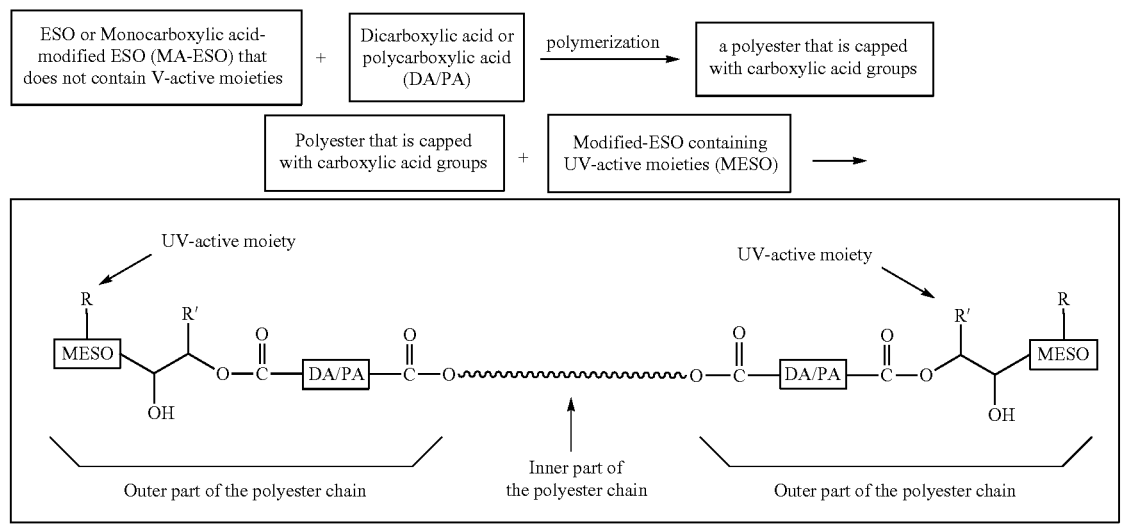

Scheme of the polymerization of DA/PA with MA-ESO that does not contain UV-active moieties and a modified-ESO that contains UV-active moieties, and a representative structure of the resulting polyester (∽∽∽ represents the remaining polymer chains; R is a UV-active moiety; and each R' is independently an alkyl group that is a part of fatty acid chains from epoxidized soybean oil)

Briefly, DA/PA is first polymerized with ESO or monocarboxylic acid-modified ESO (MA-ESO) under the reaction condition that the molar ratio of the —COOH groups of DA/PA to the epoxy groups of ESO or MA-ESO is greater than 1.0, preferably greater than 1.05. When all of the epoxy groups of ESO or MA-ESO are consumed by the —COOH of DA/PA, a polyester that is capped with —COOH groups at chain ends is obtained. The polymerization can be performed at a temperature suitably in the range from 50° C. to 250° C. for 1 h to 10 h, preferably from 100° C. to 180° C. for 2 h to 8 h, in the presence of a catalyst (see examples presented in the section "Monocarboxylic acid-modified epoxidized plants oil"). The polyester is then further reacted with modified-ESO containing UV-active moieties, which can be performed at a temperature suitably in the range from 50° C. to 250° C. for 1.5 h to 10 h, preferably from 100° C. to 180° C. for 2.5 h to 8 h. In the resulting polyesters, UV-active moieties are primarily distributed at the outer parts of the polymer chains, thus being highly exposed and having a high efficiency of taking part in the crosslinking reactions in the subsequent UV-curing.

The polyesters that contain covalently-bonded UV-active moieties can be rapidly cured with UV radiation to give PSAs. UV sources that are used herein for the curing can be ultraviolet A-band (UVA) whose wavelength ranges from 320 to 400 nm, ultraviolet B-band (UVB) whose wavelength ranges from 280 to 315 nm, and ultraviolet C-band (UVC) whose wavelength ranges from 100 to 280 nm. For example, UVB bulb, UVC bulb (both are commercially available from, e.g., Sankyo Denki Co., Ltd., Tokyo, Japan), low-pressure mercury-vapor lamps that emit primarily UVB and UVC, and medium-pressure mercury-vapor lamps that emit UVA, UVB and UVC, can be used herein for the curing purpose. When UV-active moieties such as benzophenone derivatives and acetophenone derivatives are used in the polyesters, UVB and/or UVC that best matches the absorption bands of the UV-active moieties are preferably used for the UV curing. When UV-active moieties such as thioxanthone derivatives are used in the polyesters, UVA or other UV sources that emit UVA can be used for the curing of these polyesters because thioxanthones pick up UVA and can thus be efficiently activated and work for the curing.

Typically, a UV energy dosage of 0.01-3.0 J/cm$^2$, more typically 0.1-1.5 J/cm$^2$, is enough for curing the polyesters to give PSAs with sufficient cohesive strength. It is not necessary to exclude the polyesters from ambient air that contains oxygen, e.g., by purging nitrogen gas, for the UV curing.

Possible curing reactions are proposed as follows. The UV-active moieties such as benzophenone derivatives can be excited and subsequently convert to a diradical (eq. (1) below) under appropriate UV radiation. The diradical can readily abstract aliphatic hydrogens from the polyester chains that contain relatively weak C—H bonds and convert to a ketyl radical, which at the same time yields an aliphatic carbon-centered radical (eq. (2) below).

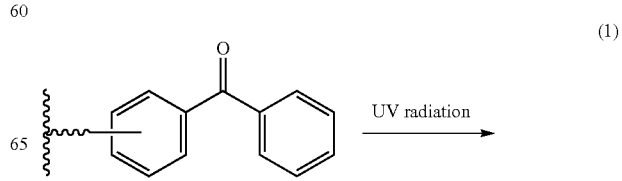

(1)

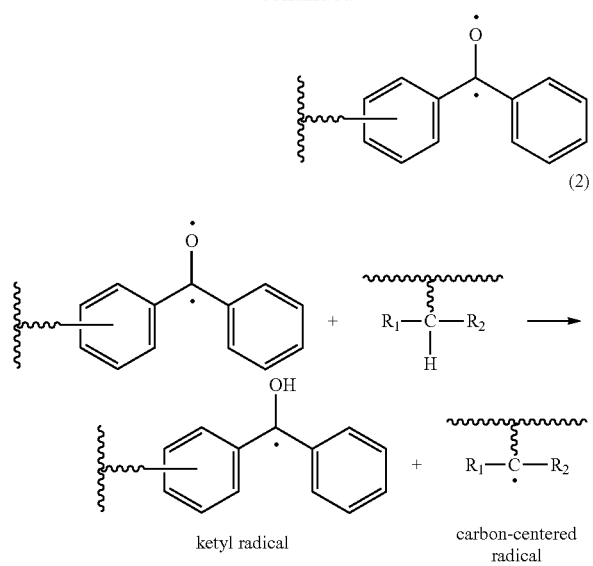

ᵚᵚᵚ is a polyester chain $R_1$ and $R_2$ are independently hydrogen or an alkyl group.

Proposed mechanism of the UV curing reactions (in certain embodiments, $R_1$ and $R_2$ are each independently hydrogen, a $C_1$-$C_6$ alkyl, or a $C_1$-$C_6$ substituted alkyl).

The generated radicals including the ketyl radical and the aliphatic carbon-centered radical could take part in the following coupling reactions: (a) the coupling reaction between two ketyl radicals; (b) the coupling reaction between a ketyl radical and an aliphatic carbon-centered radical; and (c) the coupling reaction between two aliphatic carbon-centered radicals. All of these coupling reactions result in crosslinks. In other words, all of the radicals along the polyester chains (polymeric radicals) could couple to form new carbon-carbon bonds that act as crosslinks among polyester chains, which results in an increase in the molecular weight and/or crosslinking of the polyester chains, and thus contributes to the increase in the cohesive strength of the cured polyesters. All of the generated radicals can take part in crosslinking reactions, thus the UV-curing efficiency is high.

Based on the proposed mechanism of the crosslinking and curing, the crosslinking density and thus the PSA properties of the cured polyesters can be adjusted by the usage amount of UV-active moiety. Generally, when a low amount of the UV-active moiety is used in the polyesters, UV-curing of these polyesters would result in cured polymers with a low crosslinking density, which are typically PSAs with high loop tack and high peel strength. These PSAs is desirable for applications that require high tack, e.g., deep-freeze labels that are aggressively tacky even at low temperatures. On the other hand, when a relatively high amount of the UV-active moiety is used in the polyesters, the resulting PSAs would have a relatively high crosslinking density and thus an excellent cohesive strength, which is desirable for removal or ultra-removal PSA labels that require clean removal.

For a polyester with a predetermined amount of UV-active moiety, the crosslinking density and thus the PSA properties of the cured polyesters can be also adjusted by the UV energy dosage; see, e.g., Example 6 vs 7. Generally, when a low UV dosage is used, the conversion of the UV-active moiety is not high, the cured polyester at this point has a low crosslinking density, and thus exhibits a high tack and high peel strength. On the other hand, when a relatively high UV dosage is used, the cured polyester would have a relatively high crosslinking density, and thus exhibits an excellent cohesive strength.

To meet certain particular needs, the polyesters can be also mixed with fillers and other additives, such as tackifiers, colored pigments, opacifiers, processing oils, plasticizers and solvents, to give UV-curable formulations. The formulations are then coated and UV-cured to PSAs. The fillers and additives can be used in an amount of 1 wt % to 60 wt %, preferably 10 wt % to 40 wt % based on the total mass of the PSAs.

Coating and UV-Curing of the Polyesters

The presently disclosed UV-curable polyesters are stable in viscosity and chemistry as long as they are not exposed to a strong UV source. They can readily melt on heating to give a liquid; the viscosity of the liquid can be adjusted by the heating temperature, thus being adjustable to meet the requirement of different coating techniques. Typically, a temperature from 23° C. to 150° C., preferable from 60° C. to 130° C. is enough for a viscosity that is convenient for coating.

In some embodiments (see, e.g., Examples 1, 2 and 3), the polyesters can be directly coated on a backing/facestock and exposed to UV radiation immediately after coating to give a PSA construct. In other embodiments (see, e.g., Example 4), the polyesters can be coated on a release liner, and then exposed to UV radiation. After the UV exposure, the cured polyesters can be transferred to facestock/backing materials. This process is particularly desirable for applications that use paper as the facestock because some of polyester ingredients would otherwise strike through paper if they are not cured. This process is also desirable for cases that the facestocks/backing materials are sensitive to heat and/or UV radiation and thus direct exposure to heat and/or UV must be avoided. In further embodiments, the polyesters are coated onto a release liner and then exposed to UV radiation, followed by lamination with another release liner to give a liner/polyester/liner construct; the cured polyester layer can be used as a transfer adhesive.

In still further embodiments (see, e.g., Example 5), the polyesters are coated and immediately laminated with liners or backing materials prior to UV exposure to give a backing material/polyester/liner construct. The resulting construct can be pressed with a roller to afford a smooth and uniform polyester layer, which is then subjected to UV exposure. In the cases that UVB and/or UVC is used for the curing, clear backings/liners such as polypropylene (PP) and PP-based liners (e.g., siliconized PP) are preferably used as the backing materials or liners for the above constructs because they almost do not block UVB and UVC.

In still further embodiments (see, e.g., Examples 4 and 10), a special procedure for the UV curing is used. The polyesters are coated onto a clear backing (e.g., PP film) to give a polyester/clear backing construct. Then the construct is exposed to UV radiation from both sides, i.e., one UV radiation source from the polyester side and another UV radiation source from the clear backing side. In the cases that UVB and/or UVC is used for the curing, clear PP film that does not considerably block UVB/UVC radiation is used. Preferably, one side of the clear PP film is surface-treated with corona to increase adhesion to adhesives; while the other side is not treated. The polyesters are coated on the treated side of the PP film to give a polyester/PP film laminate. The laminate is then exposed to UV radiation from both sides, which can be subsequently wound onto a core to give an adhesive tape roll. The purpose of this special UV curing procedure is to avoid the UV-blocking problem. In more details, some adhesive formulations, especially when they are coated thick, would block UVB/UVC radiation, which results in a bad through-cure. This UV-blocking problem can be eliminated if the polyester/PP film laminate is exposed to UVB radiation from both sides, which shortens the UV exposure time and thus increases the curing speed.

The UV curable polyesters and the resulting PSAs ("present PSAs") disclosed herein and the methods of making them have some unique features and merits in comparison to those disclosed or reported in the literature.

(1) Novel Polymer Compositions and Different Curing Reactions.

The polyesters do not contain any free-radically polymerizable activated C=C groups; therefore, the chemistry of the curing reactions is not based on polymerization of the C=C groups. It is proposed that, in the curing step, UV radiation induces the generation of radicals that later couple to form crosslinks, which results in an increase of the molecular weight and/or crosslinking of the polyesters, and thus contributes to the increase in the cohesive strength of the resulting PSAs.

(2) The UV-Curable Polyester are Stable.

The polyesters do not contain activated C=C moieties that are not stable at high temperature and/or long storage time. Therefore, the polyesters in this disclosure are very stable as long as they are not exposed to strong UV radiation, and thus having a long shelf life (for example, at least 18 months).

(3) High Efficiency of the Curing Reactions and Thus Fast Curing Speed.

The curing reactions of the polyesters are highly efficient, and thus a low UV energy dosage is needed for the curing. In other words, the polyesters have a fast curing speed, thus allowing a high-speed manufacturing of the PSAs; this is desirable in industrial production.

(4) Excellent Oxygen Tolerance.

In the UV curing, polymeric radicals are generated when the polyesters are exposed to UV radiation, which efficiently couple to form crosslinks even in air environment that contains oxygen. In other words, no exclusion of oxygen is necessary, which could greatly reduce the production cost of the PSAs.

(5) No Outgassing or Migration.

The polyesters can be prepared starting with chemicals with relatively high molecular weight, such as epoxidized soybean oil and dimer acid; any use of volatile organic compounds such as acrylic acid can be avoided. Also, the polyesters contain UV-active moieties are attached to the polymer chains via covalent bonds, and thus no small-molecular-weight photoinitiators are needed to be added to the polyesters for the UV curing. Furthermore, the UV-active moieties such as benzophenone derivatives do not decompose into small fragments after UV exposure. Therefore, the cured polyesters do not contain small-molecular-weight compounds or fragments, and thus have no odor, no outgassing, and no migration, which is extremely desirable for removable and ultra-removable PSAs, skin contact and other medical uses.

Illustrative embodiments are described below in the following numbered clauses:

1. A pressure sensitive adhesive construct comprising:
    (A) a backing substrate; and
    (B) a pressure sensitive adhesive composition disposed on the backing substrate, wherein the pressure sensitive adhesive composition includes an ultraviolet radiation-cured polymer made from:
        (i) at least one epoxidized plant oil;
        (ii) at least one dicarboxylic acid, at least one polycarboxylic acid, or a mixture thereof; and
        (iii) a compound that contains at least one —COOH group and at least one UV-active moiety, wherein the UV-active moiety is benzophenone or thioxanthone; a compound that contains at least one —OH group and at least one UV-active moiety, wherein the UV-active moiety is benzophenone, thioxanthone or acetophenone; phenylglyoxylic acid; or a mixture thereof.

2. A pressure sensitive adhesive construct comprising:
    (A) a backing substrate; and
    (B) a pressure sensitive adhesive composition disposed on the backing substrate, wherein the pressure sensitive adhesive composition includes an ultraviolet radiation-cured polymer made from:
        (i) at least one epoxidized plant oil;
        (ii) at least one dicarboxylic acid, at least one polycarboxylic acid, or a mixture thereof; and
        (iii) a compound that contains at least one —COOH group and at least one UV-active moiety; a compound that contains at least one —OH group and at least one UV-active moiety; phenylglyoxylic acid; or a mixture thereof, wherein the compound (iii) does not contain any free-radically polymerizable activated C=C groups.

3. The construct of clause 1 or 2, wherein the compound (iii) is a —COOH-containing benzophenone or a —COOH-containing thioxanthone.

4. The construct of clause 1 or 2, wherein the compound (iii) is 2-benzoylbenzoic acid, 4-benzoylbenzoic acid or 2-(4-benzoylphenoxy)acetic acid.

5. The construct of clause 1 or 2, wherein the compound (iii) is thioxanthone-2-carboxylic acid or thioxanthone-4-carboxylic acid.

6. The construct of clause 1 or 2, wherein the compound (iii) is phenylglyoxylic acid.

7. The construct of clause 1 or 2, wherein the compound (iii) is a —OH-containing benzophenone, a —OH-containing thioxanthone, or a —OH-containing acetophenone.

8. The construct of clause 1 or 2, wherein the compound (iii) is 4-hydroxybenzophenone or 3-hydroxybenzophenone.

9. The construct of clause 1 or 2, wherein the compound (iii) is 2-hydroxythioxanthen-9-one.

10. The construct of clause 1 or 2, wherein the compound (iii) is 4'-hydroxyacetophenone or 3'-hydroxyacetophenone.

11. The construct of any one of clauses 1 to 10, wherein component (i) is monocarboxylic acid-modified epoxidized soybean oil.

12. The construct of clause 11, wherein the monocarboxylic acid modifier is formic acid, acetic acid, propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachildic acid, heneicosylic acid, behenic acid, tricosylic acid, and lignoceric acid, naphthalene acid, oleic acid, linoleic acid, myristoleic acid, palmitoleic acid, sapienic acid, elaidic acid, vaccenic acid, linoelaidic acid, linolenic acid, arachidonic acid, eicosapentaenoic acid, erucic acid, docosahexanenoic acid, abietic acid or tall oil rosin that contains abietic acid, benzoic acid, phenylacetic acid, 1-naphthaleneacetic acid, 2-naphthaleneacetic acid, 1-naphthoic acid, 2-naphthoic acid, 2-furoic acid, 3-methylpyridine-2-carboxylic acid, 1-methylpyrrole-2-carboxylic acid, pyrimidine-2-carboxylic acid, or an anhydride thereof, or a mixture thereof.

13. The construct of any one of clauses 1 to 10, wherein component (i) is epoxidized soybean oil.

14. The construct of any one of clauses 1 to 13, wherein component (ii) is malonic acid, succinic acid, glutaric acid, adipic acid, pimelic acid, suberic acid, azelaic acid, sebacic acid, and brassylic acid, phthalic acid, isophthalic acid, terephthalic acid, dimer acid, trimer acid, or an anhydride thereof, or a mixture thereof.

15. The construct of any one of clauses 1 to 13, wherein component (ii) includes a dimer acid.

16. A pressure sensitive adhesive composition comprising an ultraviolet radiation-cured polymer made from:
    (i) at least one epoxidized plant oil;
    (ii) at least one dicarboxylic acid, at least one polycarboxylic acid, or a mixture thereof; and
    (iii) a compound that contains at least one —COOH group and at least one UV-active moiety, wherein the UV-active moiety is benzophenone or thioxanthone; a compound that contains at least one —OH group and at least one UV-active moiety, wherein the UV-active moiety is benzophenone, thioxanthone or acetophenone; phenylglyoxylic acid; or a mixture thereof.

17. A pressure sensitive adhesive composition comprising an ultraviolet radiation-cured polymer made from:
    (i) at least one epoxidized plant oil;
    (ii) at least one dicarboxylic acid, at least one polycarboxylic acid, or a mixture thereof; and
    (iii) a compound that contains at least one —COOH group and at least one UV-active moiety; a compound that contains at least one —OH group and at least one UV-active moiety; phenylglyoxylic acid; or a mixture thereof, wherein the compound (iii) does not contain any free-radically polymerizable activated C=C groups.

18. An ultraviolet radiation-curable composition comprising:
    (i) at least one epoxidized plant oil;
    (ii) at least one dicarboxylic acid, at least one polycarboxylic acid, or a mixture thereof; and
    (iii) a compound that contains at least one —COOH group and at least one UV-active moiety, wherein the UV-active moiety is benzophenone or thioxanthone; a compound that contains at least one —OH group and at least one UV-active moiety, wherein the UV-active moiety is benzophenone, thioxanthone or acetophenone; phenylglyoxylic acid; or a mixture thereof.

19. An ultraviolet radiation-curable composition comprising:
    (i) at least one epoxidized plant oil;
    (ii) at least one dicarboxylic acid, at least one polycarboxylic acid, or a mixture thereof; and
    (iii) a compound that contains at least one —COOH group and at least one UV-active moiety; a compound that contains at least one —OH group and at least one UV-active moiety; phenylglyoxylic acid; or a mixture thereof, wherein the compound (iii) does not contain any free-radically polymerizable activated C=C groups.

20. A method comprising:
    polymerizing (i) at least one epoxidized plant oil; (ii) at least one dicarboxylic acid, at least one polycarboxylic acid, or a mixture thereof; and (iii) a compound that contains at least one —COOH group and at least one UV-active moiety, wherein the UV-active moiety is benzophenone or thioxanthone; a compound that contains at least one —OH group and at least one UV-active moiety, wherein the UV-active moiety is benzophenone, thioxanthone or acetophenone; phenylglyoxylic acid; or a mixture thereof and
    subjecting the resulting resin to ultraviolet radiation to form a crosslinked polymer.

21. The method of clause 20, further comprising modifying the at least one epoxidized plant oil with at least one monocarboxylic acid.

22. The method of clause 21, wherein the modifying is performed prior to the polymerizing.

23. The method of clause 20, comprising:
    reacting together the at least one epoxidized plant oil, at least one monocarboxylic acid, and the compound (iii) to form a modified epoxidized plant oil that contains the at least one UV-active moiety; and
    reacting (a) the resulting modified epoxidized plant that contains the at least one UV-active moiety with (b) the at least one dicarboxylic acid, at least one polycarboxylic acid, or a mixture thereof.

24. The method of clause 20, comprising:
    forming a mixture of (a) a modified epoxidized plant oil that contains the at least one UV-active moiety and (b) a monocarboxylic acid-modified epoxidized plant oil that does not contain a UV-active moiety; and
    reacting the resulting mixture with the at least one dicarboxylic acid, at least one polycarboxylic acid, or a mixture thereof.

25. The method of clause 20, comprising:
    reacting the at least one dicarboxylic acid, at least one polycarboxylic acid, or a mixture thereof with (i) the at least one epoxidized plant oil or a monocarboxylic acid-modified epoxidized plant oil under reaction condition that the molar ratio of —COOH groups of the at least one dicarboxylic acid, at least one polycarboxylic acid, or a mixture thereof to the epoxy groups of the at least one epoxidized plant oil or a monocarboxylic acid-modified epoxidized plant oil is greater than 1.0 to form a polyester that is capped with —COOH groups at chain ends; and
    reacting the resulting polyester with a modified epoxidized plant oil that contains the at least one UV-active moiety.

26. The method of any one of clauses 20 to 25, wherein oxygen is not excluded during subjecting the resulting resin to ultraviolet radiation.

27. The method of any one of clauses 20 to 26, wherein component (i) is epoxidized soybean oil.

28. The method of any one of clauses 20 to 27, wherein component (ii) is malonic acid, succinic acid, glutaric acid, adipic acid, pimelic acid, suberic acid, azelaic acid, sebacic acid, and brassylic acid, phthalic acid, isophthalic acid, terephthalic acid, dimer acid, trimer acid, or an anhydride thereof, or a mixture thereof.

Test Methods

Measurement of the peel strength of a PSA. Measurement of the peel strength is performed on a stainless steel panel (type 302 with a bright annealed finish) in accordance with Test Method A of ASTM D3330/D3330M-04 (Standard Test Method for Peel Adhesion of Pressure-Sensitive Tape, reapproved 2010). Briefly, the measurement is performed with an Instron Testing Machine (model 5582, Instron, Norwood, MA) at 23±1° C. and 40±5% RH. One end of a PSA specimen tape (24 mm by 200 mm) is applied onto the steel panel and then pressed with a roller with a weight of 2040 g twice in the lengthwise direction. The other free end of the tape is attached to the grip that is connected to the load cell of the testing machine. After 1 h, the tape is peeled upwards at 180° angle at a speed of 5 mm/s. The force required to peel off the tape from the test panel is recorded. Three specimens are tested for each PSA sample and the averaged value in N/cm is reported as the peel strength. Unless otherwise noted, the failure mode is adhesive failure, i.e., the sample is cleanly removed, leaving no adhesive residue on the test panel.

Measurement of the shear adhesion of a PSA. The shear adhesion is measured on a stainless steel test panel (type 302 with a bright annealed finish) in accordance with the Procedure A of ASTM D3654/D3654M-06 (Standard Test Methods for Shear Adhesion of Pressure-Sensitive Tapes). Briefly, the measurement is performed at 23±1° C. and 40±5% RH. A strip of PSA tape with 24 mm in width and 130 mm in length is applied with its one end onto the test panel with a contact area of 24 by 24 mm; the tape on the panel is then pressed with a roller with a weight of 2040 g twice in lengthwise direction. The other end of the PSA tape is attached to a constant mass of 1000 g. The distance from the mass to the test panel is about 50 mm. After 20 min, the test panel along with the applied PSA tape and mass are hung on a stand at an angle of 2° relative to the vertical direction, allowing the mass hanging in the air. A timing system is used to record the time when the tape separated from the panel. The time from the point that the tape is hung onto the stand to the point that the tape completely separates from the test panel is recorded as the indication of shear adhesion. Three specimens are tested for each PSA sample and averaged value in hour is reported as the shear adhesion of the PSA sample.

Accelerated aging test at 60° C. The aging test for the PSAs is performed in accordance with the standards PSTC-2 (12th Edition) and ASTM D1000-93. Briefly, PSA tapes laminated with a release liner are placed in an Isotemp 625D Incubators (Thermo Fisher Scientific Inc., Waltham, MA) at 60° C. After two weeks, the tapes are taken out and conditioned at 23±1° C. and 40±5% RH for 24 h. PSA specimens are then prepared from the aged tapes and measured for their peel strength and shear adhesion in accordance with the methods described previously. Two weeks of accelerated aging at a temperature of 60° C. is comparable to 18 months of natural aging for typical commercial PSA products.

EXAMPLES

Example 1. A PSA from ESO, Dimer Acid, Acetic Acid and 4-Hydroxybenzophenone

ESO (16.01 g), acetic acid (0.78 g), 4-hydroxybenzophenone (0.96 g) and benzyltriethylammonium chloride (0.071 g) are placed in a flask. The resulting mixture is stirred and heated at 115° C. for 2.5 h and then at 145° C. for another 2 h, at which point both of the carboxylic acid group of the acetic acid and the hydroxyl group of the 4-hydrobenzophenone are consumed (this is evidenced with Fourier-transform infrared spectroscopy (FTIR) analysis). Subsequently, UNIDYME 18 (15.98 g) and magnesium acetate hydrate (0.34 g) are added. The resulting mixture is stirred and heated at 150° C. for 8 h to give a viscous polymer.

The polymer is then coated at 85° C. onto poly(ethylene terephthalate) (PET) film at a coating thickness of about 0.025 mm with a HLCL-1000 hot-melt coater/laminator (ChemInstruments, Inc. (Fairfield, OH)). The coating layer is then exposed to UVB radiation until a UV energy dosage of 0.4 J/cm$^2$ is used. The cured adhesive layer is analyzed with FTIR, which shows that the peak of C=O of benzophenone moiety at 1660 cm$^{-1}$ disappears and the peak of the hydroxyl group at 3500 cm$^{-1}$ increases in the FTIR spectrum of the cured adhesive. This indicates the formation of the hydroxyl group of the ketyl (see eq. (2)), and thus supports the proposed mechanism regarding the conversion of benzophenone moiety as described previously. The cured adhesive is measured as a PSA for its peel strength and shear adhesion (see the sections "Measurement of the peel strength of a PSA" and "Measurement of the shear adhesion of a PSA", respectively, for details). The results on the properties of the adhesive are summarized in Table 1. The PSA has a shear adhesion of at least 168 hours, which indicates that it has a sufficient cohesive strength.

TABLE 1

Properties of the PSAs prepared herein.

| Examples | UV source | UV energy (Joules/cm$^2$) | Peel strength[a] (N/cm) | Shear adhesion (h) | Peel strength after aging[a] (N/cm) |
|---|---|---|---|---|---|
| 1 | UVB | 0.4 | 2.7 ± 0.2 | >168 | 2.3 ± 0.3 |
| 2 | UVB | 0.4 | 1.7 ± 0.2 | not measured | 1.3 ± 0.2 |
| 3 | UVB | 1.5 | 3.8 ± 0.4 | >168 | 3.2 ± 0.3 |
| 4 | UVB | 0.75 | 3.6 ± 0.3 | not measured | 3.2 ± 0.3 |
| 5 | UVB | 0.3 | 1.7 ± 0.2 | >168 | not measured |
| 6 | UVB | 0.4 | 2.0 ± 0.2 | >168 | 1.7 ± 0.2 |
| 7 | UVB | 0.9 | 0.6 ± 0.1 | >168 | 0.6 ± 0.1 |
| 8 | UVB | 0.25 | 4.0 ± 0.5 | >168 | 3.0 ± 0.3 |
| 9 | UVC | 1.2 | 4.9 ± 0.3 | >168 | 4.5 ± 0.2 |
| 10 | UVB | 0.9 | 4.1 ± 0.3 | >168 | 3.3 ± 0.3 |
| 11 | UVB | 0.25 | 2.5 ± 0.2 | >168 | 2.5 ± 0.2 |
| 12 | UVB | 0.6 | 1.8 ± 0.2 | >168 | 1.6 ± 0.2 |
| 13 | UVB | 0.6 | 2.3 ± 0.2 | >168 | not measured |
| 14 | UVB | 1.0 | 2.0 ± 0.2 | >168 | not measured |
| 15 | Hg-UV[b] | 1.0 | 4.2 ± 0.3 | >168 | 3.6 ± 0.3 |
| 16 | UVC | 0.3 | 3.1 ± 0.3 | >168 | 2.7 ± 0.2 |

[a]All of the PSAs tested exhibit adhesive failure, i.e., no residues are left on the test panel;
[b]Hg-UV is a medium-pressure mercury-vapor lamp that emits UVA, UVB and UVC.

Example 2. A PSA from ESO, Dimer Acid, Acetic Acid and 4-Hydroxybenzophenone

This example is the same as example 1, except that a lower amount of 4-hydroxybenzophenone is used and the thickness of the final PSA layer is thinner.

ESO (12.64 g), acetic acid (0.78 g), 4-hydroxybenzophenone (0.65 g) and benzyltriethylammonium chloride (0.057 g) are placed in a flask. The resulting mixture is stirred and heated at 115° C. for 2.5 h and then at 145° C. for another 2 h, at which point both of the carboxylic acid group of the acetic acid and the hydroxyl group of the 4-hydrobenzophenone are consumed. Subsequently, UNIDYME 18 (11.81 g) and magnesium acetate hydrate (0.21 g) are added. The resulting mixture is stirred and heated at 150° C. for 8 h to give a viscous polymer.

The polymer is then coated at 85° C. onto biaxially oriented polypropylene (BOPP) film at a coating thickness of about 0.012 mm with a coater. The coating layer is then exposed to UVB radiation. After a UV energy dosage of 0.4 J/cm$^2$ is used, a PSA with sufficient cohesive strength is obtained. The PSA is measured for its peel strength and shear adhesion; the results on the properties of the PSA are summarized in Table 1.

Example 3. A PSA from ESO, Adipic Acid, Benzoic Acid and 4-Hydroxybenzophenone

ESO (12.85 g), benzoic acid (1.745 g), 4-hydroxybenzophenone (0.52 g) and benzyltriethylammonium chloride (0.075 g) are placed in a flask. The resulting mixture is stirred and heated at 150° C. for 2.5 h, at which point both of the carboxylic acid group of the benzoic acid and the hydroxyl group of the 4-hydrobenzophenone are consumed. Subsequently, adipic acid (2.94 g) and 1-methylimidazole (0.072 g) are added. The resulting mixture is stirred and heated at 150° C. for 8 h to give a viscous polymer.

The polymer is then coated at 90° C. onto PET film at a coating thickness of about 0.025 mm with a coater. The coating layer is then exposed to UVB radiation. After a UV energy dosage of 1.5 J/cm$^2$ is used, a PSA with sufficient cohesive strength is obtained. The PSA is measured for its peel strength and shear adhesion; the results on the properties of the PSA are summarized in Table 1.

Example 4. A PSA from ESO, Adipic Acid, Benzoic Acid and 4-Hydroxybenzophenone

This example is the same as Example 3, except that a different UV curing procedure is used. Briefly, the polymer from Example 5 is coated at 90° C. on siliconized PET film (Si-PET) at a coating thickness of about 0.025 mm with a coater. The resulting Si-PET/polymer laminate is then exposed to UVB radiation with the polymer side exposed to the UV source. After a UV energy dosage of 0.4 J/cm$^2$ is used, the laminate is laminated with a clear PP film to give a Si-PET/polymer/PP laminate. The new laminate is then exposed to UVB radiation with the PP side facing the UV source. After a UV energy dosage of 0.35 J/cm$^2$ is used, a PSA with sufficient cohesive strength is obtained. The PSA is measured for its peel strength and shear adhesion; the results on the properties of the PSA are summarized in Table 1.

Example 5. A PSA from ESO, Dimer Acid, Linoleic Acid, 4-Hydroxybenzophenone

ESO (15.85 g), linoleic acid (2.71 g), 4-hydroxybenzophenone (1.10 g) and benzyltriethylammonium chloride (0.05 g) are placed in a flask. The resulting mixture is stirred and heated at 150° C. until both of the carboxylic acid group of the linoleic acid and the hydroxyl group of the 4-hydrobenzophenone are consumed, which takes about 2.5 h. Subsequently, UNIDYME 18 (16.41 g) and magnesium acetate hydrate (0.17 g) are added. The resulting mixture is stirred and heated at 150° C. for 8 h to give a viscous polymer.

The polymer is then coated at 85° C. onto PET film at a coating thickness of about 0.025 mm with a coater. The coating layer is then laminated with siliconized polypropylene (Si-PP) film (obtained from Loparex, Inc. (Cary, NC)) to give PET/adhesive polymer/Si-PP laminate. The laminate is then exposed to UVB radiation with the Si-PP side facing the UV source. After a UV energy dosage of 0.3 J/cm$^2$ is used, a PSA with sufficient cohesive strength is obtained. The PSA is measured for its peel strength and shear adhesion; the results on the properties of the PSA are summarized in Table 1.

Example 6. A PSA from ESO, Dimer Acid, Acetic Acid and 4-Benzoylbenzoic Acid

Acetic acid (2.03 g), tetra(n-butyl)ammonium bromide (0.20 g) and ESO (25.66 g) are placed in a flask. The resulting mixture is stirred and heated at 115° C. for 1.5 h and then at 130° C. for another 1 h; at this point, all of the carboxylic acid group of the acetic acid is consumed. The resulting product is designated as AA-ESO.

In another flask, ESO (8.64 g), magnesium acetate hydrate (0.012 g) and 4-benzoylbenzoic acid (2.11 g) are placed; the resulting mixture is stirred and heated at 150° C. until the carboxylic acid group of the 4-benzoylbenzoic acid is consumed, which takes about 2 h. Then, UNIDYME 18 (31.12 g) and AA-ESO (27.88 g) are added; the resulting mixture is stirred and heated at 150° C. for 9 h to give a viscous polymer.

The polymer is then coated at 85° C. onto PET film at a coating thickness of about 0.025 mm with a coater. The coating layer is then exposed to UVB radiation. After a UV energy dosage of 0.4 J/cm$^2$ is used, a PSA with sufficient cohesive strength is obtained. The PSA is measured for its peel strength and shear adhesion; the results on the properties of the PSA are summarized in Table 1.

Example 7. A PSA from ESO, Dimer Acid, Acetic Acid and 4-Benzoylbenzoic Acid

This example is the same as Example 6 except that a higher UV energy dosage of 0.9 J/cm$^2$ is used. The PSA is measured for its peel strength and shear adhesion; the results on the properties of the PSA are summarized in Table 1.

Example 8. A PSA from ESO, Dimer Acid, Acetic Acid, 4-Benzoylbenzoic Acid and 1,2-Ethylenediamine Acetic acid (1.34 g), benzyl triethylammonium chloride (0.08 g) and ESO (16.88 g) are placed in a flask. The resulting mixture is stirred and heated at 115° C. for 1.5 h and then at 130° C. for another 1 h; at this point, all of the carboxylic acid group of the acetic acid is consumed. The resulting product is designated as AA-ESO.

In another flask, ESO (9.75 g), magnesium acetate hydrate (0.013 g) and 4-benzoylbenzoic acid (2.38 g) are placed; the resulting mixture is stirred and heated at 150° C. for 2 h. The resulting product is designated as BBA-ESO.

In still another flask, UNIDYME 18 (44.00 g) is placed and heated to 90° C. 1,2-Ethylenediamine (2.08 g) is then added drop-wise over a period of about 5 min. The resulting mixture is stirred and heated at 120° C. for 0.5 h and then at 155° C. for 2 h. Subsequently, the reaction mixture is purged with nitrogen gas while being stirred and heated at the same temperature for another 0.5 h. Afterwards, AA-ESO (18.26 g) and BBA-ESO (12.13 g) are added, and the resulting mixture is stirred and heated at 150° C. for 10 h to give a viscous polymer.

The polymer is then coated at 95° C. onto PET film at a coating thickness of about 0.025 mm with a coater. The coating layer is then exposed to UVB radiation. After a UV energy dosage of 0.25 J/cm$^2$ is used, a PSA with sufficient cohesive strength is obtained. The PSA is measured for its peel strength and shear adhesion; the results on the properties of the PSA are summarized in Table 1.

Example 9. A PSA from ESO, Dimer Acid, Acetic Acid, 2-Benzoylbenzoic Acid and 1,2-Ethylenediamine ESO (66.67 g), acetic acid (5.24 g) and triethylamine (0.56 g) are placed in a flask. The resulting mixture is stirred and heated at 115° C. until the carboxylic acid group of acetic acid is consumed, which takes about 4 h. The resulting product is designated as AA-ESO.

In another flask, ESO (21.66 g), magnesium acetate hydrate (0.025 g) and 2-benzoylbenzoic acid (5.38 g) are placed; the resulting mixture is stirred and heated at 150° C. for 2 h. The resulting product is designated as BBA-ESO.

In a reaction vessel, UNIDYME 18 (142.93 g) is placed and heated to 90° C. 1,2-Ethylenediamine (6.76 g) is then added drop-wise over a period of about 5 min. The resulting mixture is stirred and heated at 120° C. for 0.5 h and then at 155° C. for 2 h. Subsequently, the reaction mixture is purged with nitrogen gas while being stirred and heated at the same temperature for another 0.5 h. Afterwards, AA-ESO (72.47 g) and BBA-ESO (27.06 g) are added, and the resulting mixture is stirred and heated at 150° C. for 10 h to give a viscous polymer.

The polymer is then coated at 95° C. onto PET film at a coating thickness of about 0.025 mm with a coater. The coating layer is then exposed to UVC radiation. After a UV energy dosage of 1.2 J/cm$^2$ is used, a PSA with sufficient cohesive strength is obtained. The PSA is measured for its peel strength and shear adhesion; the results on the properties of the PSA are summarized in Table 1.

Example 10. A PSA from ESO, Dimer Acid, Acetic Acid, 2-Benzoylbenzoic Acid and 1,2-Ethylenediamine This example is the same as Example 9 except that a different UV curing procedure is used. Briefly, the polymer from Example 9 is coated at 95° C. on siliconize PET film (Si-PET) at a coating thickness of about 0.025 mm with a coater. The resulting Si-PET/polymer laminate is then exposed to UVB radiation with the polymer side exposed to the UV source. After a UV energy dosage of 0.5 J/cm$^2$ is used, the laminate is laminated with a clear PP film to give a Si-PET/polymer/PP laminate. The new laminate is then exposed to UVB radiation with the PP side facing the UV source. After a UV energy dosage of 0.4 J/cm$^2$ is used, a PSA with sufficient cohesive strength is obtained. The PSA is measured for its peel strength and shear adhesion; the results on the properties of the PSA are summarized in Table 1.

Example 11. A PSA from ESO, Dimer Acid, Acetic Acid and 4-Hydroxybenzophenone

ESO (6.83 g), 4-hydroxybenzophenone (2.48 g) and benzyltriethylammonium chloride (0.047 g) are placed in a flask. The resulting mixture is stirred and heated at 150° C. until the hydroxyl group of 4-hydrobenzophenone is consumed, which takes about 2 h. The resulting product is designated as HBP-ESO.

In another flask, acetic acid (2.98 g), benzyl triethylammonium chloride (0.14 g) and ESO (44.86 g) are placed. The resulting mixture is stirred and heated at 115° C. for 1.5 h and then at 130° C. for another 1 h; at this point, all of the carboxylic acid group of acetic acid is consumed. Then, UNIDYME 18 (48.06 g) and magnesium acetate hydrate (0.96 g) are added; the resulting mixture is stirred and heated at 150° C. for 5 h. Afterwards, HBP-ESO (9.35 g) is added, and the resulting mixture is stirred and heated at 150° C. for 9 h to give a viscous polymer.

The polymer is then coated at 90° C. onto PET film at a coating thickness of about 0.025 mm with a coater. The coating layer is then exposed to UVB radiation. After a UV energy dosage of 0.25 J/cm$^2$ is used, a PSA with sufficient cohesive strength is obtained. The PSA is measured for its peel strength and shear adhesion; the results on the properties of the PSA are summarized in Table 1.

Example 12. A PSA from ESO, Dimer Acid, Acetic Acid and 4-Hydroxybenzophenone

This example is the same as Example 11 except that a higher UV energy dosage of 0.6 J/cm$^2$ is used. The PSA is measured for its peel strength and shear adhesion; the results on the properties of the PSA are summarized in Table 1.

Example 13. A PSA from ESO, Dimer Acid, Adipic Acid, Acetic Acid and 2-Benzoylbenzoic Acid ESO (11.09 g), magnesium acetate hydrate (0.018 g) and 2-benzoylbenzoic acid (2.81 g) are placed in a flask; the resulting mixture is stirred and heated at 150° C. until the carboxylic acid group of 2-benzoylbenzoic acid is consumed, which takes about 2 h. Then, UNIDYME 18 (3.81 g) is added; the resulting mixture is stirred and heated at 150° C. for 3 h. The resulting product is designated as BBA-ESO-UNIDYME.

In another flask, ESO (20.98 g), acetic acid (1.65 g) and triethylamine (0.30 g) are placed; the resulting mixture is stirred and heated at 115° C. until the carboxylic acid group of acetic acid is consumed, which takes about 4 h. Then, adipic acid (3.68 g) and UNIDYME 18 (3.91 g) are added; the resulting mixture is stirred and heated at 130° C. for 2 h and then at 145° C. for another 3 h. Subsequently, BBA-ESO-UNIDYME (17.73 g) is added; and the resulting mixture is stirred and heated at 150° C. for 3 h to give a viscous polymer.

The polymer is then coated at 95° C. onto PET film at a coating thickness of about 0.025 mm with a coater. The coating layer is then exposed to UVB radiation. After a UV energy dosage of 0.6 J/cm$^2$ is used, a PSA with sufficient cohesive strength is obtained. The PSA is measured for its peel strength and shear adhesion; the results on the properties of the PSA are summarized in Table 1.

Example 14. A PSA from ESO, Dimer Acid, Linoleic Acid and 2-Benzoylbenzoic Acid

ESO (9.36 g), magnesium acetate hydrate (0.015 g) and 2-benzoylbenzoic acid (2.37 g) are placed in a flask; the resulting mixture is stirred and heated at 150° C. until the carboxylic acid group of 2-benzoylbenzoic acid is consumed, which takes about 2 h. Then, UNIDYME 18 (3.21 g)

is then added; the resulting mixture is stirred and heated at 150° C. for 3 h. The resulting product is designated as BBA-ESO-UNIDYME.

In another flask, linoleic acid (4.16 g), magnesium acetate hydrate (0.028 g) and ESO (13.38 g) are placed; the resulting mixture is stirred and heated at 150° C. for 2 h. Then, dimer acid (12.39 g; obtained from Sigma-Aldrich, Corp. (St. Louis, Missouri); number-averaged molecular weight~570) is added to the reaction mixture, and the resulting mixture is stirred and heated at 150° C. for 8 h. Afterwards, BBA-ESO-UNIDYME (14.97 g) is added, and the resulting mixture is stirred and heated at 155° C. for 4 h to give a viscous polymer.

The polymer is then coated at 85° C. onto BOPP film at a coating thickness of about 0.025 mm with a coater. The coating layer is then exposed to UVB radiation. After a UV energy dosage of 1.0 $J/cm^2$ is used, a PSA with sufficient cohesive strength is obtained. The PSA is measured for its peel strength and shear adhesion; the results on the properties of the PSA are summarized in Table 1.

Example 15. A PSA from ESO, Dimer Acid, Acetic Acid, 2-Benzoylbenzoic Acid and 1,6-Hexanediamine ESO (18.05 g), acetic acid (1.42 g) and triethylamine (0.15 g) are placed in a flask. The resulting mixture is stirred and heated at 115° C. until the carboxylic acid group of acetic acid is consumed, which takes about 4 h. The resulting product is designated as AA-ESO.

In another flask, ESO (11.09 g), magnesium acetate hydrate (0.018 g) and 2-benzoylbenzoic acid (2.81 g) are added; the resulting mixture is stirred and heated at 150° C. for 2 h. Then, UNIDYME 18 (3.81 g) is added; the resulting mixture is stirred and heated at 150° C. for 3 h. The resulting product is designated as BBA-ESO-UNIDYME.

In still another flask, UNIDYME 18 (30.31 g) is added and heated to 110° C. 1,6-hexanediamine (2.82 g) is then added; the resulting mixture is stirred and heated at 120° C. for 0.5 h and then at 160° C. for 2 h. Subsequently, the reaction mixture is purged with nitrogen gas while being stirred and heated at 160° C. for 15 min. Afterwards, AA-ESO (19.62 g) is added; and the resulting mixture is stirred and heated at 150° C. for 5 h and then at 160° C. for 2.5 h. Finally, BBA-ESO-UNIDYME (17.73 g) is added; and the resulting mixture is stirred and heated at 150° C. for 3 h and then at 160° C. for 1.5 h to give a viscous polymer.

The polymer is then coated at 85° C. onto BOPP film at a coating thickness of about 0.025 mm with a coater. The coating layer is then exposed to UV radiation under a medium-pressure mercury-vapor lamp. After a UV energy dosage of 1.0 $J/cm^2$ is used, a PSA with sufficient cohesive strength is obtained. The PSA is measured for its peel strength and shear adhesion; the results on the properties of the PSA are summarized in Table 1.

Example 16. A PSA from ESO, Dimer Acid, Linoleic Acid, 2-Benzoylbenzoic Acid and 1,2-Ethylenediamine ESO (7.98 g), linoleic acid (2.48 g) and magnesium acetate (0.012 g) are placed in a flask. The resulting mixture is stirred and heated at 150° C. until the carboxylic acid group of linoleic acid is consumed, which takes about 2 h. The resulting product is designated as LA-ESO.

In another flask, ESO (5.05 g), magnesium acetate hydrate (0.01 g) and 2-benzoylbenzoic acid (1.28 g) are added; the resulting mixture is stirred and heated at 150° C. for 2 h. Then UNIDYME 18 (1.74 g) is added; the resulting mixture is stirred and heated at 150° C. for 3 h. The resulting product is designated as BBA-ESO-UNIDYME.

In still another flask, UNIDYME 18 (14.29 g) is placed and heated to 90° C. 1,2-Ethylenediamine (0.68 g) is then added drop-wise over a period of about 5 min. The resulting mixture is stirred and heated at 120° C. for 0.5 h and then at 155° C. for 2 h. Subsequently, the reaction mixture is purged with nitrogen gas while being stirred and heated at the same temperature for another 0.5 h. Afterwards, LA-ESO (10.47 g) is added, and the resulting mixture is stirred and heated at 150° C. for 8 h. Finally, BBA-ESO-UNIDYME (8.08 g) is added; and the resulting mixture is stirred and heated at 150° C. for 3 h and then at 160° C. for 1.5 h to give a viscous polymer.

The polymer is then coated at 95° C. onto PET film at a coating thickness of about 0.025 mm with a coater. The coating layer is then exposed to UVC radiation. After a UV energy dosage of 0.3 $J/cm^2$ is used, a PSA with sufficient cohesive strength is obtained. The PSA is measured for its peel strength and shear adhesion; the results on the properties of the PSA are summarized in Table 1.

In view of the many possible embodiments to which the principles of the disclosed compositions, articles and methods may be applied, it should be recognized that the illustrated embodiments are only preferred examples of the invention and should not be taken as limiting the scope of the invention.

What is claimed is:

1. An ultraviolet radiation-curable composition comprising a polyester having at least one pendant ultraviolet radiation-curable moiety covalently bonded to the polyester, wherein the polyester does not contain any free-radically polymerizable activated C=C groups, wherein the composition is made from reacting (i) at least one modified epoxidized plant oil that contains the covalently bonded ultraviolet radiation-curable moiety with (ii) at least one dicarboxylic acid, at least one polycarboxylic acid, or a mixture thereof.

2. The composition of claim 1, wherein the at least one modified epoxidized plant oil (i) is made from reacting (a) at least one epoxidized plant oil with (b) a compound that contains at least one-COOH group and at least one UV-active moiety, wherein the UV-active moiety is benzophenone or thioxanthone; a compound that contains at least one —OH group and at least one UV-active moiety, wherein the UV-active moiety is benzophenone, thioxanthone or acetophenone; phenylglyoxylic acid; or a mixture thereof.

3. The composition of claim 2, wherein the compound (b) is a —COOH-containing benzophenone or a —COOH-containing thioxanthone.

4. The composition of claim 2, wherein the compound (b) is 2-benzoylbenzoic acid, 4-benzoylbenzoic acid or 2-(4-benzoylphenoxy) acetic acid.

5. The composition of claim 2, wherein the compound (b) is thioxanthone-2-carboxylic acid or thioxanthone-4-carboxylic acid.

6. The composition of claim 2, wherein the compound (b) is phenylglyoxylic acid.

7. The composition of claim 2, wherein the compound (b) is a —OH-containing benzophenone, a —OH-containing thioxanthone, or a —OH-containing acetophenone.

8. The composition of claim 2, wherein the compound (b) is 4-hydroxybenzophenone or 3-hydroxybenzophenone.

9. The composition of claim 2, wherein the compound (b) is 2-hydroxythioxanthen-9-one.

10. The composition of claim 2, wherein the compound (b) is 4'-hydroxyacetophenone or 3'-hydroxyacetophenone.

11. The composition of claim 2, wherein component (a) is monocarboxylic acid-modified epoxidized soybean oil.

12. The composition of claim 11, wherein the monocarboxylic acid modifier is formic acid, acetic acid, propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachildic acid, heneicosylic acid, behenic acid, tricosylic acid, and lignoceric acid, naphthalene acid, oleic acid, linoleic acid, myristoleic acid, palmitoleic acid, sapienic acid, elaidic acid, vaccenic acid, linoelaidic acid, linolenic acid, arachidonic acid, eicosapentaenoic acid, erucic acid, docosahexanenoic acid, abietic acid or tall oil rosin that contains abietic acid, benzoic acid, phenylacetic acid, 1-naphthaleneacetic acid, 2-naphthaleneacetic acid, 1-naphthoic acid, 2-naphthoic acid, 2-furoic acid, 3-methylpyridine-2-carboxylic acid, 1-methylpyrrole-2-carboxylic acid, pyrimidine-2-carboxylic acid, or an anhydride thereof, or a mixture thereof.

13. The composition of claim 1, wherein the epoxidized plant oil is epoxidized soybean oil.

14. The composition of claim 1, wherein component (ii) is malonic acid, succinic acid, glutaric acid, adipic acid, pimelic acid, suberic acid, azelaic acid, sebacic acid, and brassylic acid, phthalic acid, isophthalic acid, terephthalic acid, dimer acid, trimer acid, or an anhydride thereof, or a mixture thereof.

15. The composition of claim 1, wherein component (ii) includes a dimer acid.

16. The composition of claim 1, wherein ultraviolet radiation-curable moiety is benzophenone, thioxanthone or acetophenone.

17. The composition of claim 1, wherein component (ii) comprises a polyamide capped with a —COOH group at chain ends of the polyamide.

18. The composition of claim 17, wherein the —COOH-capped polyamide is made from polymerizing at least one dicarboxylic acid or polycarboxylic acid with at least one diamine or at least one polyamine under a reaction condition that the molar ratio of the —COOH groups of the dicarboxylic acid or polycarboxylic acid to the amine groups of the diamine or polyamine is greater than 1.0.

19. A pressure sensitive adhesive composition made by ultraviolet radiation curing of the composition of claim 1.

20. A pressure sensitive adhesive construct comprising:
(A) a backing substrate; and
(B) the pressure sensitive adhesive composition of claim 19 disposed on the backing substrate.

21. A method comprising:
reacting (a) at least one epoxidized plant oil with (b) a compound that contains at least one —COOH group and at least one UV-active moiety, wherein the UV-active moiety is benzophenone or thioxanthone; a compound that contains at least one —OH group and at least one UV-active moiety, wherein the UV-active moiety is benzophenone, thioxanthone or acetophenone; phenylglyoxylic acid; or a mixture thereof, resulting in covalently bonding the at least one UV-active moiety to the epoxidized plant oil; and
reacting the resulting modified epoxidized plant oil that contains the at least one covalently bonded UV-active moiety with (c) at least one dicarboxylic acid, at least one polycarboxylic acid, or a mixture thereof, to form a resin.

22. The method of claim 21, wherein the resulting modified epoxidized plant oil has an average of from 0.01 mole to 1.8 moles of UV-active moiety per mole of plant oil molecule.

23. The method of claim 21, further comprising subjecting the resulting resin to ultraviolet radiation to form a crosslinked polymer.

24. The method of claim 21, further comprising modifying the at least one epoxidized plant oil with at least one monocarboxylic acid.

25. The method of claim 24, wherein the modifying of the at least one epoxidized plant oil comprises mixing together the at least one monocarboxylic acid, the at least one epoxidized plant oil (a), and compound (b).

26. The method of claim 21, comprising:
forming a mixture of the modified epoxidized plant oil that contains the at least one covalently bonded UV-active moiety and a monocarboxylic acid-modified epoxidized plant oil that does not contain a UV-active moiety; and
reacting the resulting mixture with the at least one dicarboxylic acid, at least one polycarboxylic acid, or a mixture thereof.

27. The method of claim 23, wherein exclusion of oxygen is not necessary during subjecting the resulting resin to ultraviolet radiation.

28. The method of claim 21, wherein the at least one epoxidized plant oil is epoxidized soybean oil.

29. The method of claim 21, wherein component (c) is malonic acid, succinic acid, glutaric acid, adipic acid, pimelic acid, suberic acid, azelaic acid, sebacic acid, and brassylic acid, phthalic acid, isophthalic acid, terephthalic acid, dimer acid, trimer acid, or an anhydride thereof, or a mixture thereof.

30. A method comprising:
reacting at least one dicarboxylic acid, at least one polycarboxylic acid, or a mixture thereof with (i) at least one epoxidized plant oil or a monocarboxylic acid-modified epoxidized plant oil under reaction condition that the molar ratio of —COOH groups of the at least one dicarboxylic acid, at least one polycarboxylic acid, or a mixture thereof to the epoxy groups of the at least one epoxidized plant oil or a monocarboxylic acid-modified epoxidized plant oil is greater than 1.0 to form a polyester that is capped with —COOH groups at chain ends; and
reacting the resulting polyester with a modified epoxidized plant oil that contains at least one covalently bonded UV-active moiety.

31. A method of making a construct comprising:
applying the composition of claim 1 to a backing substrate; and
subjecting the composition to ultraviolet radiation to form a pressure sensitive adhesive from the composition.

32. A pressure sensitive adhesive composition made by ultraviolet radiation curing of a polyester having at least one pendant ultraviolet radiation-curable moiety covalently bonded to the polyester, wherein the polyester does not contain any free-radically polymerizable activated C═C groups.

* * * * *